US012057915B2

(12) United States Patent
Raghavan et al.

(10) Patent No.: US 12,057,915 B2
(45) Date of Patent: Aug. 6, 2024

(54) MACHINE LEARNING BASED ANTENNA SELECTION

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 17/933,648

(22) Filed: Sep. 20, 2022

(65) Prior Publication Data

US 2024/0097768 A1 Mar. 21, 2024

(51) Int. Cl.
*H04B 7/06* (2006.01)
*H04L 5/00* (2006.01)
*H04W 72/044* (2023.01)
*H04W 76/15* (2018.01)

(52) U.S. Cl.
CPC ......... *H04B 7/0691* (2013.01); *H04L 5/0048* (2013.01); *H04W 72/046* (2013.01); *H04W 72/0473* (2013.01); *H04W 76/15* (2018.02)

(58) Field of Classification Search
CPC ............... H04B 7/0691; H04L 5/0048; H04W 72/046; H04W 72/0473; H04W 76/15
See application file for complete search history.

(56) References Cited

U.S. PATENT DOCUMENTS

| | | | |
|---|---|---|---|
| 10,484,033 B1* | 11/2019 | Li | H04M 1/72454 |
| 10,666,342 B1 | 5/2020 | Landis et al. | |
| 2013/0023218 A1* | 1/2013 | Ali | H01Q 19/30 |
| | | | 455/67.14 |
| 2015/0179043 A1* | 6/2015 | Gude | H04B 17/318 |
| | | | 455/226.2 |
| 2018/0048366 A1* | 2/2018 | Sundararajan | H04B 7/0689 |
| 2020/0412417 A1 | 12/2020 | Calzolari et al. | |
| 2021/0159990 A1* | 5/2021 | Meylan | G08B 7/06 |
| 2022/0225118 A1 | 7/2022 | Pefkianakis et al. | |

OTHER PUBLICATIONS

International Search Report and Written Opinion—PCT/US2023/032918—ISA/EPO—Jan. 15, 2024.

* cited by examiner

*Primary Examiner* — Jean B Corrielus
(74) *Attorney, Agent, or Firm* — Procopio, Cory, Hargreaves & Savitch LLP/Qualcomm Incorporated

(57) ABSTRACT

A method for wireless communication at a UE is disclosed herein. The method includes transmitting a first indication of an obstruction of at least a portion of a plurality of antenna elements of the UE. The method includes receiving a second indication of at least two antenna elements of the plurality of antenna elements, where the second indication is based on the first indication and a set of usage patterns of a plurality of UEs. The method includes combining the at least two antenna elements in the plurality of antenna elements based on the second indication. The method includes transmitting or receiving first data or at least one signal via the combined at least two antenna elements.

30 Claims, 16 Drawing Sheets

MACHINE LEARNING BASED ANTENNA SELECTION

TECHNICAL FIELD

The present disclosure relates generally to communication systems, and more particularly, to antenna selection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus includes a memory and at least one processor and, based at least in part on information stored in the memory, the at least one processor is configured to transmit a first indication of an obstruction of at least a portion of a plurality of antenna elements of the UE; receive a second indication of at least two antenna elements of the plurality of antenna elements, where the second indication is based on the first indication and a set of usage patterns of a plurality of UEs; combine the at least two antenna elements in the plurality of antenna elements based on the second indication; and transmit or receive first data or at least one signal via the combined at least two antenna elements.

In an aspect of the disclosure, a method, a computer-readable medium, and an apparatus for wireless communication at a network node are provided. The apparatus includes a memory and at least one processor and, based at least in part on information stored in the memory, the at least one processor is configured to receive a first indication of an obstruction of at least a portion of a plurality of antenna elements of a user equipment (UE); provide, based on the first indication, data associated with the obstruction as input to a machine learning (ML) model that includes one or more learned parameters that are based on a set of usage patterns of a plurality of UEs; obtain an output from the ML model based on the data and the one or more learned parameters; transmit, for the UE and based on the output of the ML model, a second indication of at least two antenna elements of the plurality of antenna elements of the UE, where the at least two antenna elements are to be combined; and transmit or receive first data or at least one signal via the combined at least two antenna elements.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
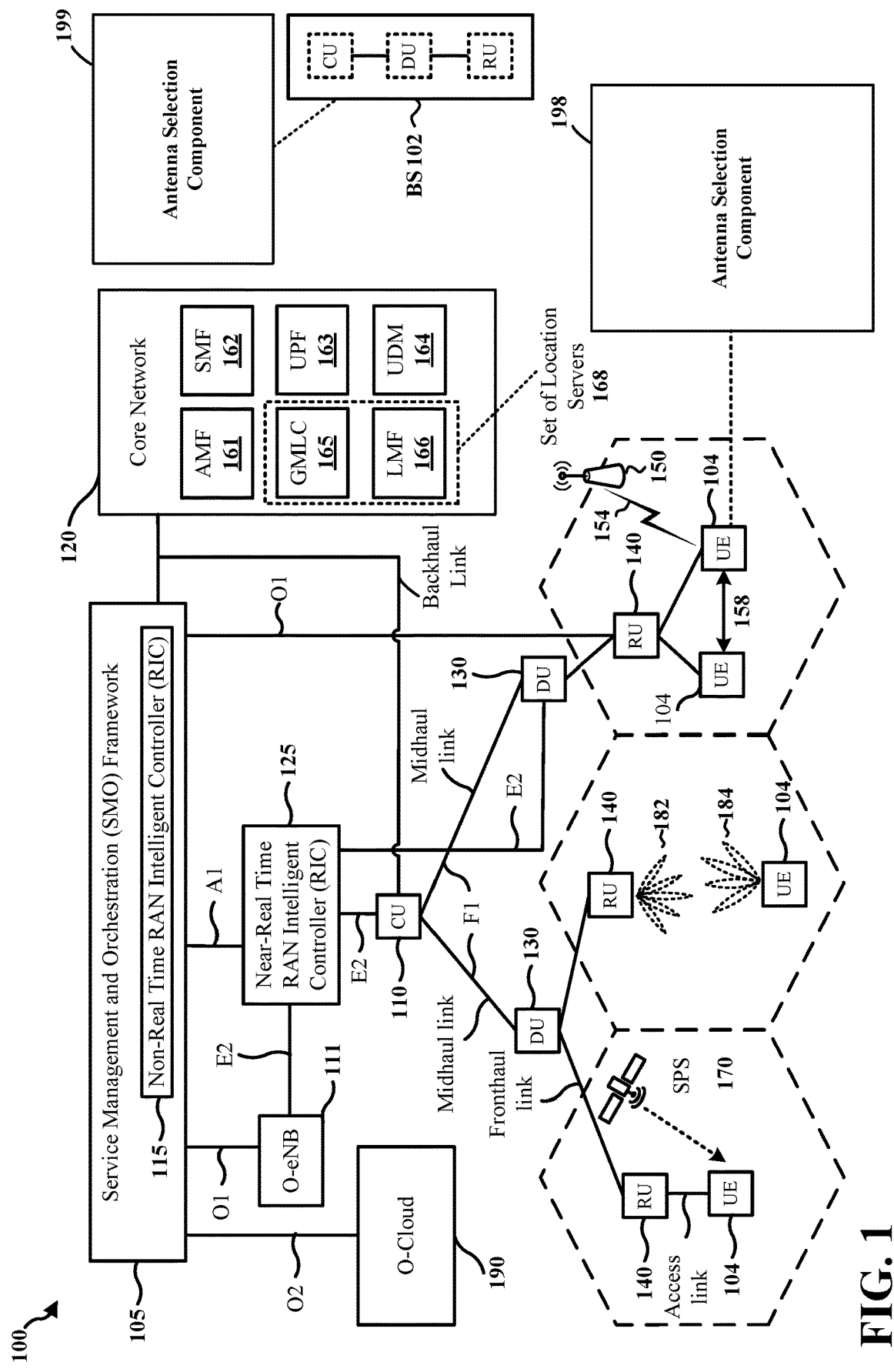
FIG. 1 is a diagram illustrating an example of a wireless communications system and an access network.

A UE may be configured with multiple antenna elements that may be selectively combined in order to increase gain associated with transmission/reception of data/signals. When the UE is held in the hands of a user, a portion of the antenna elements may become blocked. Blocked antenna elements may be associated with a reduction in antenna array gain, which may impact communications reliability at the UE. A UE may select different combinations of antenna elements to combine by performing signal quality measurements for each of the different combinations; however, performing signal quality measurements for the different combinations may be time consuming, may consume UE power, and/or may impact computational resources of the UE. Various technologies pertaining to ML based antenna selection are described herein. In an example, a UE transmits a first indication of an obstruction of at least a portion of a plurality of antenna elements of the UE. An obstruction may refer to an object (e.g., a body part) that blocks a signal at a UE. The UE receives a second indication of at least two antenna elements of the plurality of antenna elements, where the second indication is based on the first indication and a set of usage patterns of a plurality of UEs. An antenna element may refer to a radiator. A usage pattern may refer to a how a user of a UE holds the UE. In an example, the second indication is based on an output of a ML model, where the ML model may utilize a crowdsourced approach for determining which antenna elements may be combined to achieve relatively high antenna array gains for communications at UEs. The UE combines the at least two antenna elements in the plurality of antenna elements based on the second indication. The UE may combine the antenna elements via beamforming. The UE transmits or receives first data or at least one signal via the combined at least two antenna elements. Vis-à-vis receiving the second indication of the at least two antenna elements, the UE may be able to combine antenna elements and transmit/receive data via the combined antenna elements in a manner associated with a relatively high antenna array gain and hence may improve communications reliability at the UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an antenna selection component 198 that is configured to transmit a first indication of an obstruction of at least a portion of a plurality of antenna elements of the UE; receive a second indication of at least two antenna elements of the plurality of antenna elements, where the second indication is based on the first indication and a set of usage patterns of a plurality of UEs; combine the at least two antenna elements in the plurality of antenna elements based on the second indication; and transmit or receive first data or at least one signal via the combined at least two antenna elements. In certain aspects, the base station 102 may include an antenna selection component 199 that is configured to receive a first indication of an obstruction of at least a portion of a plurality of antenna elements of a UE; provide, based on the first indication, data associated with the obstruction as input to a ML model that includes one or more learned parameters that are based on a set of usage patterns of a plurality of UEs; obtain an output from the ML model based on the data and the one or more learned parameters; transmit, for the UE and based on the output of the ML model, a second indication of at least two antenna elements of the plurality of antenna elements of the UE, where the at least two antenna elements are to be combined; and transmit or receive first data or at least one signal via the combined at least two antenna elements. Although the following description may be focused on an L-shaped antenna module, the concepts described herein may be applicable to other antenna module configurations as well. Furthermore, although the L-shaped antenna module is depicted as having two sides each having four antenna elements, the concepts described herein may be applicable to antenna modules having different numbers of sides (e.g., three) with different numbers of antenna elements (e.g., five, ten, etc.). Although the following description may be focused on 5G NR, the concepts described herein may be applicable to other similar areas, such as LTE, LTE-A, CDMA, GSM, and other wireless technologies.

Figure 2:
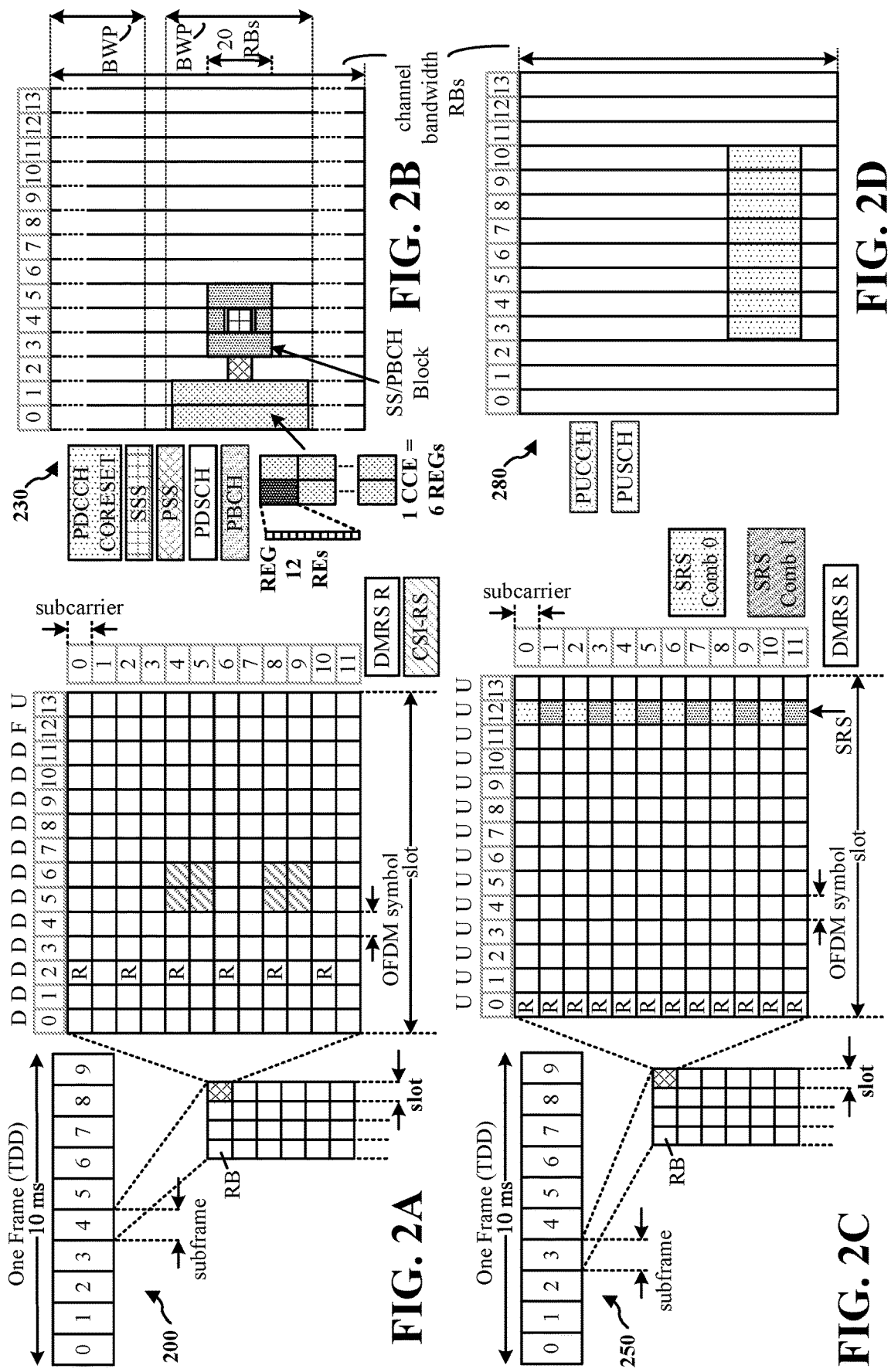
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology 1.1=0 has a subcarrier spacing of 15 kHz and the numerology 1.1=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
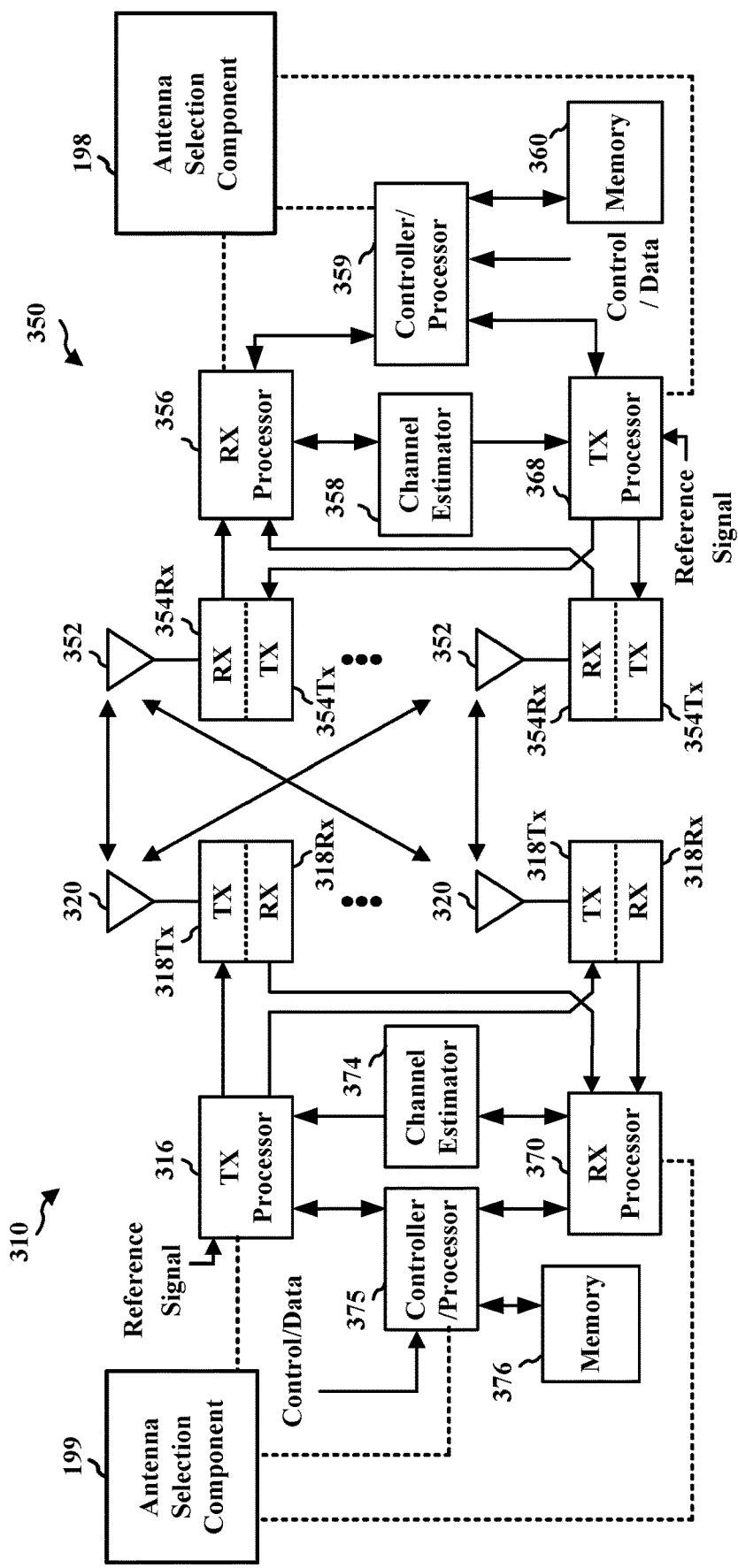
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the antenna selection component 198 of FIG. 1.

At least one of the TX processor 316, the RX processor 370, and the controller/processor 375 may be configured to perform aspects in connection with the antenna selection component 199 of FIG. 1.

Figure 4:
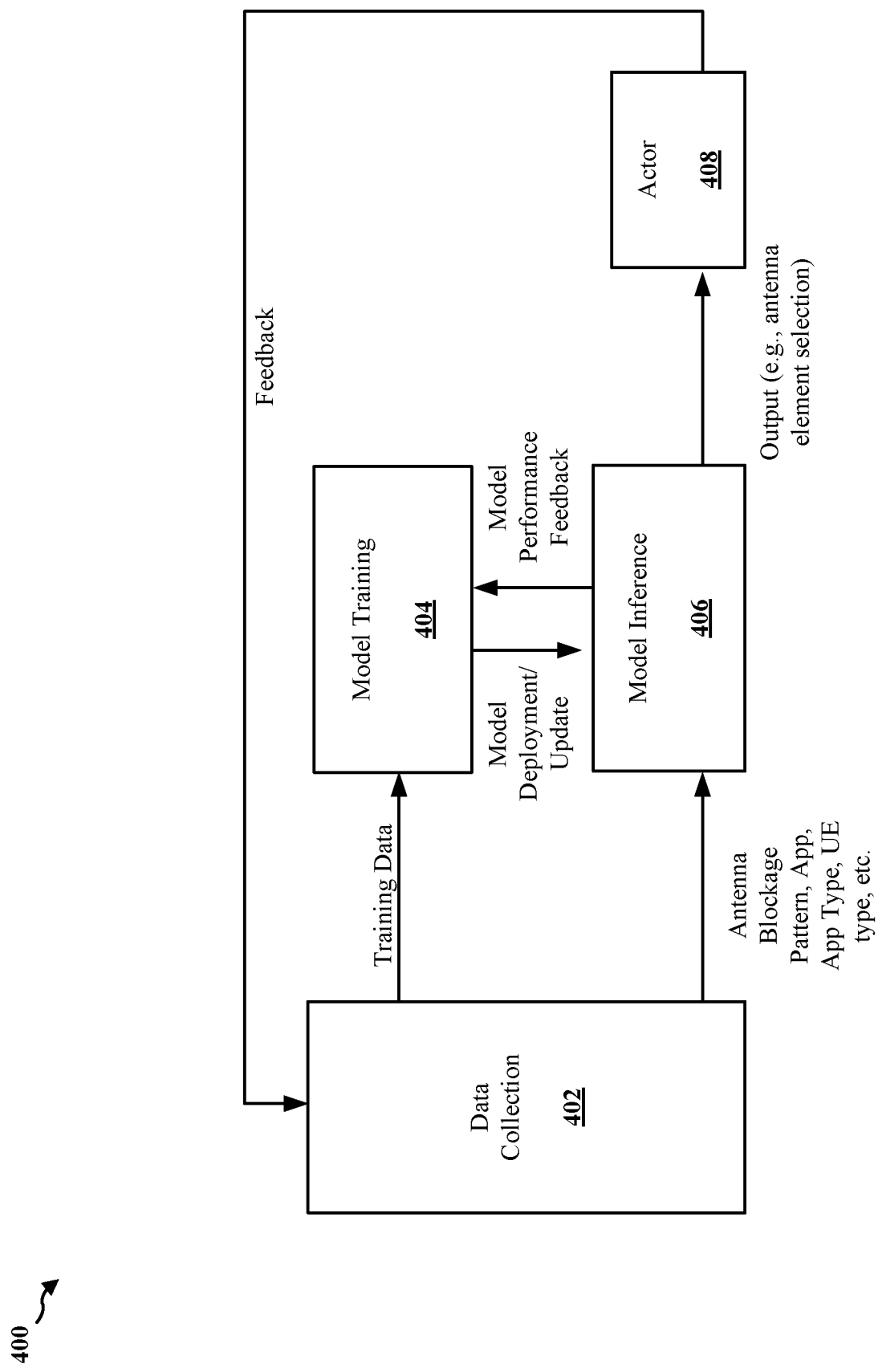
FIG. 4 is an example of an artificial intelligence (AI)/machine learning (ML) algorithm that may be used in connection with wireless communication.

FIG. 4 is an example of a AI/ML algorithm 400 that may be used in connection with wireless communication. The AI/ML algorithm 400 may include various functions including a data collection 402, a model training function 404, a model inference function 406, and an actor 408.

The data collection 402 may be a function that provides input data to the model training function 404 and the model inference function 406. The data collection 402 function may include any form of data preparation, and it may not be specific to the implementation of the AI/ML algorithm (e.g., data pre-processing and cleaning, formatting, and transformation). The examples of input data may include, but not limited to, indications of obstructions of antenna elements of UEs, indications of applications being executed by the UEs while the antenna elements are being obstructed, indications of types of applications being executed by the UEs while the antenna elements are being obstructed, antenna array gain associated with the UEs while the antenna elements are being obstructed and/or while the UEs are executing the applications and/or the types of applications, from UEs or network nodes, feedback from the actor 408, output from another AI/ML model. The data collection 402 may include training data, which refers to the data to be sent as the input for the model training function 404, and inference data, which refers to be sent as the input for the model inference function 406.

The model training function 404 may be a function that performs the ML model training, validation, and testing, which may generate model performance metrics as part of the model testing procedure. The model training function 404 may also be responsible for data preparation (e.g., data pre-processing and cleaning, formatting, and transformation) based on the training data delivered or received from the data collection 402 function. The model training function 404 may deploy or update a trained, validated, and tested AI/ML model to the model inference function 406, and receive a model performance feedback from the model inference function 406.

The model inference function 406 may be a function that provides the AI/ML model inference output (e.g., predictions or decisions). The model inference function 406 may also perform data preparation (e.g., data pre-processing and cleaning, formatting, and transformation) based on the inference data delivered from the data collection 402 function. The output of the model inference function 406 may include the inference output of the AI/ML model produced by the model inference function 406. The details of the inference output may be use-case specific. As an example, the output may include an indication of at least two antenna elements of a UE that may be combined and that may be used for transmission and/or reception of data or a signal. In some aspects, the actor 408 may be a UE or a network node at the UE.

The model performance feedback may refer to information derived from the model inference function 406 that may be suitable for improvement of the AI/ML model trained in the model training function 404. The feedback from the actor 408 or other network entities (via the data collection 402 function) may be implemented for the model inference function 406 to create the model performance feedback.

The actor 408 may be a function that receives the output from the model inference function 406 and triggers or performs corresponding actions. The actor may trigger actions directed to network entities including the other network entities or itself. The actor 408 may also provide a feedback information that the model training function 404 or the model inference function 406 to derive training or inference data or performance feedback. The feedback may be transmitted back to the data collection 402.

The network may use machine-learning algorithms, deep-learning algorithms, neural networks, reinforcement learning, regression, boosting, or advanced signal processing methods for aspects of wireless communication including the identification of at least two antenna elements of a UE that may be combined and that may be used for transmission and/or reception of data or a signal at the UE.

In some aspects described herein, the network may train one or more neural networks to learn dependence of measured qualities on individual parameters. Among others, examples of machine learning models or neural networks that may be included in the network entity include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; Bayesian networks (BNs); genetic algorithms; deep convolutional networks (DCNs) configured with additional pooling and normalization layers; and deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network may include any number of nodes and any type of connections between nodes. The neural network may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times.

Figure 5:
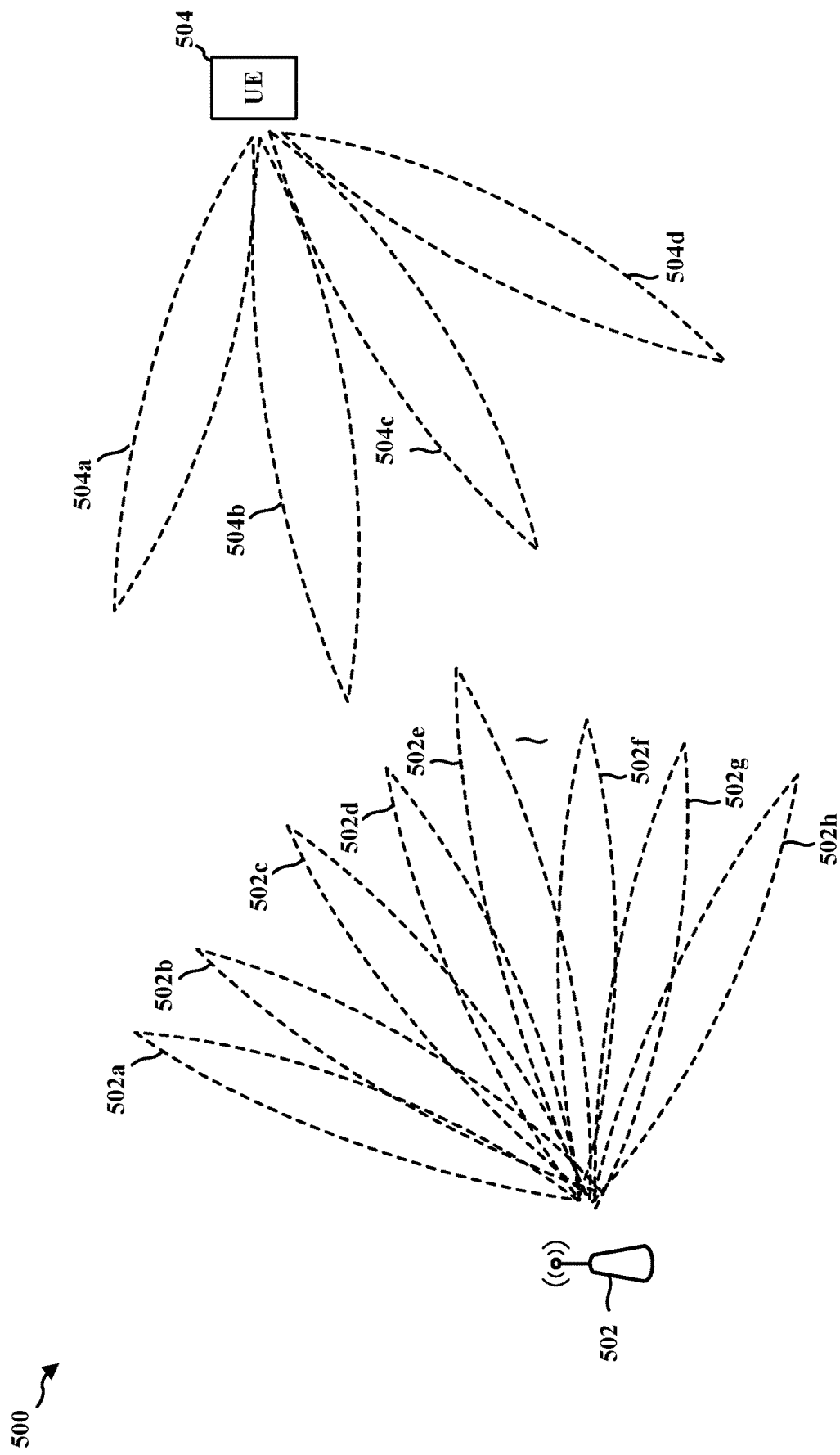
FIG. 5 is a diagram illustrating example aspects of beamforming.

FIG. 5 is a diagram 500 illustrating example aspects of beamforming. As described in connection with the diagram 500 in FIG. 5, a base station 502 and UE 504 may communicate over active data/control beams both for DL communication and UL communication. The base station and/or UE may switch to a new beam direction using beam failure recovery procedures. Referring to FIG. 5, the base station 502 may transmit a beamformed signal to the UE 504 in one or more of the directions 502*a*, 502*b*, 502*c*, 502*d*, 502*e*, 502*f*, 502*g*, 502*h*. The UE 504 may receive the beamformed signal from the base station 502 in one or more receive directions 504a, 504b, 504c, 504d. The UE 504 may also transmit a beamformed signal to the base station 502 in one or more of the directions 504a-504d. The base station 502 may receive the beamformed signal from the UE 504 in one or more of the receive directions 502a-502h. The base station 502/UE 504 may perform beam training to determine the best receive and transmit directions for each of the base station 502/UE 504. The transmit and receive directions for the base station 502 may or may not be the same. The transmit and receive directions for the UE 504 may or may not be the same.

In response to different conditions, the UE 504 may determine to switch beams, e.g., between beams 502a-502h. The beam at the UE 504 may be used for reception of downlink communication and/or transmission of uplink communication. In some examples, the base station 502 may send a transmission that triggers a beam switch by the UE 504. For example, the base station 502 may indicate a transmission configuration indication (TCI) state change, and in response, the UE 504 may switch to a new beam for the new TCI state of the base station 502. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication. In some aspects, a single MAC-CE command may be sent by the base station to trigger the changing of the TCI state on multiple CCs.

A TCI state may include quasi-co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The base station may indicate a TCI state to the UE as a transmission configuration that indicates QCL relationships between one signal (e.g., a reference signal) and the signal to be transmitted/received. For example, a TCI state may indicate a QCL relationship between DL RS s in one RS set and PDSCH/PDCCH DM-RS ports. TCI states can provide information about different beam selections for the UE to use for transmitting/receiving various signals. Under a unified TCI framework, different types of common TCI states may be indicated. For example, a type 1 TCI may be a joint DL/UL common TCI state to indicate a common beam for at least one DL channel or RS and at least one UL channel or RS. A type 2 TCI may be a separate DL (e.g., separate from UL) common TCI state to indicate a common beam for more than one DL channel or RS. A type 3 TCI may be a separate UL common TCI state to indicate a common beam for more than one UL channel/RS. A type 4 TCI may be a separate DL single channel or RS TCI state to indicate a beam for a single DL channel or RS. A type 5 TCI may be a separate UL single channel or RS TCI state to indicate a beam for a single UL channel or RS. A type 6 TCI may include UL spatial relation information (e.g., such as sounding reference signal (SRS) resource indicator (SRI)) to indicate a beam for a single UL channel or RS. An example RS may be an SSB, a tracking reference signal (TRS) and associated CSI-RS for tracking, a CSI-RS for beam management, a CSI-RS for CQI management, a DM-RS associated with non-UE-dedicated reception on PDSCH and a subset (which may be a full set) of control resource sets (CORESETs), or the like. A TCI state may be defined to represent at least one source RS to provide a reference (e.g., UE assumption) for determining quasi-co-location (QCL) or spatial filters. For example, a TCI state may define a QCL assumption between a source RS and a target RS.

Before receiving a TCI state, a UE may assume that the antenna ports of one DM-RS port group of a PDSCH are spatially quasi-co-located (QCLed) with an SSB determined in the initial access procedure with respect to one or more of: a Doppler shift, a Doppler spread, an average delay, a delay spread, a set of spatial Rx parameters, or the like. After receiving the new TCI state, the UE may assume that the antenna ports of one DM-RS port group of a PDSCH of a serving cell are QCLed with the RS(s) in the RS set with respect to the QCL type parameter(s) given by the indicated TCI state. Regarding the QCL types, QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters (e.g., associated with beam information such as beamforming properties for finding a beam).

In another aspect, a spatial relation change, such as a spatial relation update, may trigger the UE to switch beams. Beamforming may be applied to uplink channels, such as but not limited to PUCCH. Beamforming may be based on configuring one or more spatial relations between the uplink and downlink signals. Spatial relation indicates that a UE may transmit the uplink signal using the same beam as it used for receiving the corresponding downlink signal.

In another aspect, the base station 502 may change a pathloss reference signal configuration that the UE uses to determine power control for uplink transmissions, such as SRS, PUCCH, and/or PUSCH. In response to the change in the pathloss reference signal, the UE 504 may determine to switch to a new beam.

Figure 6:
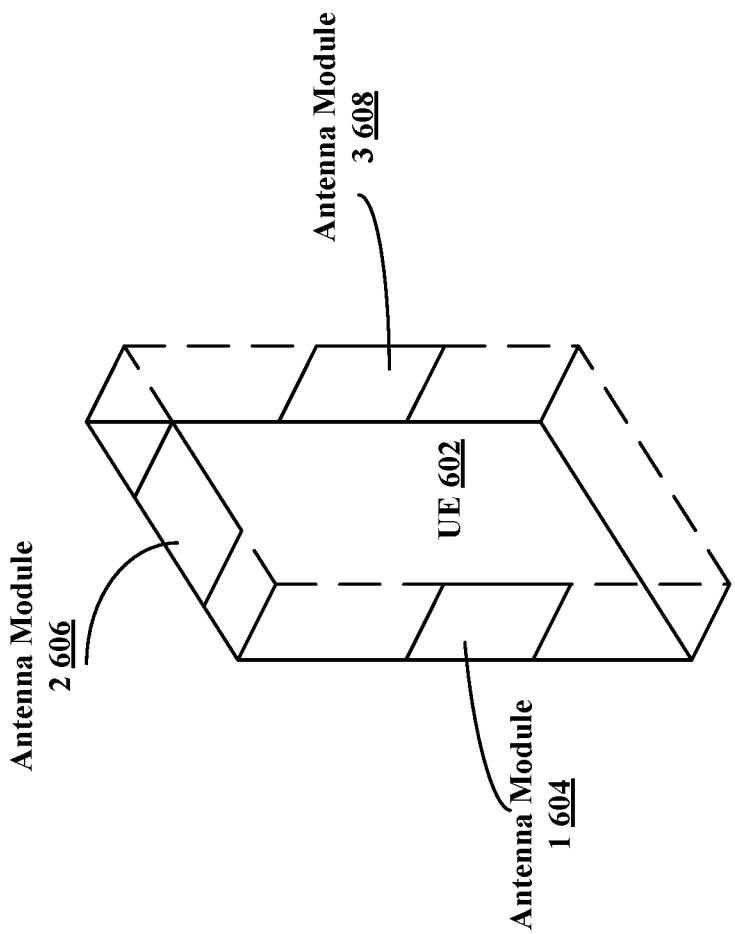
FIG. 6 is a diagram illustrating example antenna modules on a UE.

FIG. 6 is a diagram 600 illustrating an example of a UE 602 that includes a first antenna module 604, a second antenna module 606, and a third antenna module 608. In an example, the first antenna module 604, the second antenna module 606, and the third antenna module 608 may be used for millimeter wave communications at the UE 602. As depicted in the diagram 600, the second antenna module 606 may be placed on a top edge (e.g., a short edge) of the UE 602. The first antenna module 604 and the third antenna module 608 may be placed on side edges (e.g., long edges) of the UE 602. Each of the first antenna module 604, the second antenna module 606, and the third antenna module 608 may include a number of antenna elements. In an example, each of the first antenna module 604, the second antenna module 606, and the third antenna module 608 may include a 4×1 dual-polarized antenna array or a 5×1 dual-polarized antenna array. Each of the first antenna module 604, the second antenna module 606, and the third antenna module 608 may include one or more antenna elements.

The UE 602 may perform beamforming using the first antenna module 604, the second antenna module 606, and/or the third antenna module 608 to bridge a link budget associated with a millimeter wave communication system. For instance, each of the first antenna module 604, the second antenna module 606, and the third antenna module 608 may have a set of antenna elements that may be co-phased for beamforming. Placement of the first antenna module 604, the second antenna module 606, and the third antenna module 608 on the UE 602 may lead to different beamforming capabilities and/or different performance characteristics. The UE 602 may use the first antenna module 604, the second antenna module 606, and/or the third antenna module 608 to meet spherical coverage criteria with or without hand blockage of the UE 602 by hands of a user of the UE 602. The first antenna module 604, the second antenna module 606, and/or the third antenna module 608 may also provide robustness for beam switching.

Figure 7:
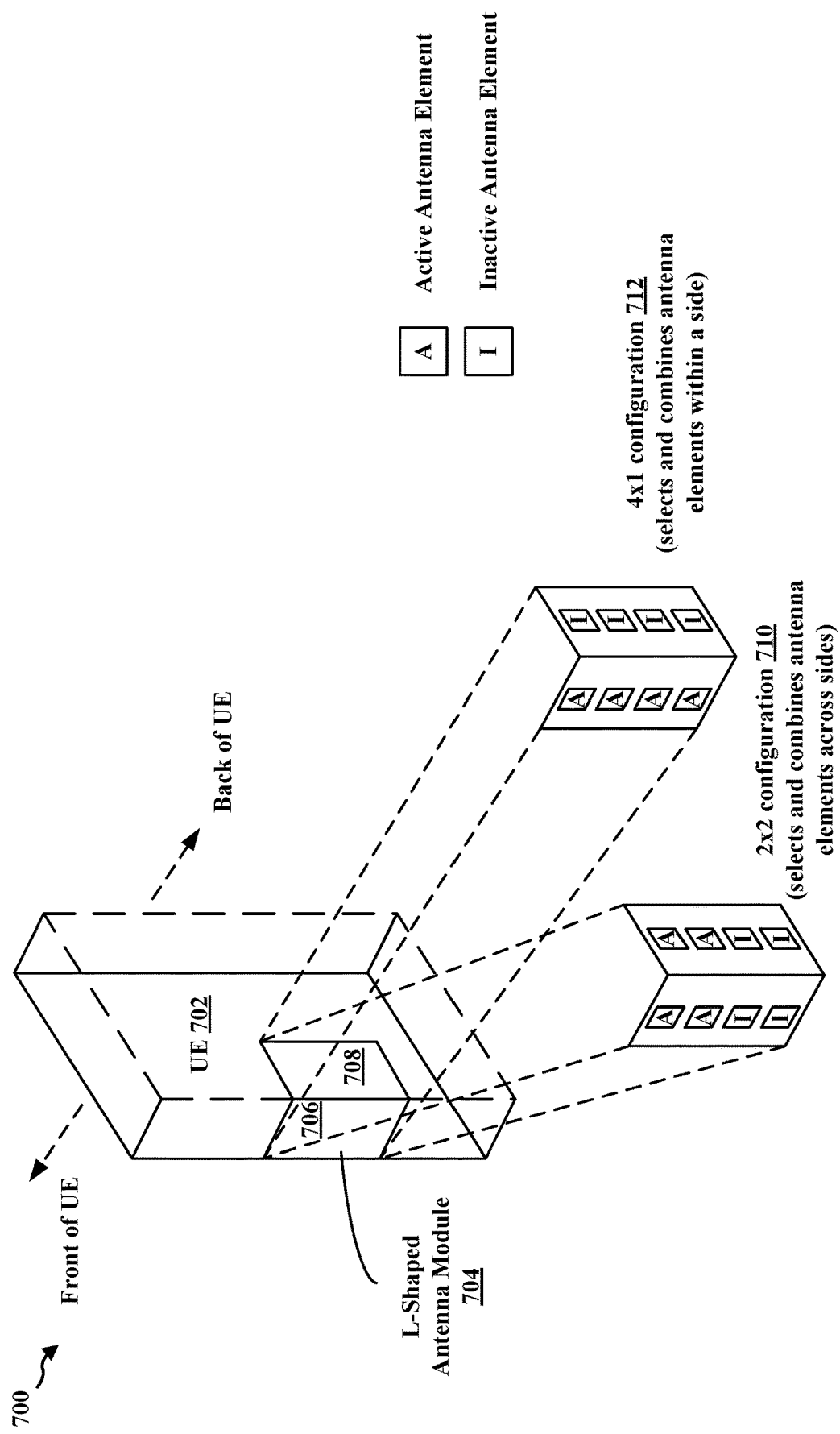
FIG. 7 is a diagram illustrating an example L-shaped antenna module on a UE.

FIG. 7 is a diagram 700 illustrating an example L-shaped antenna module 704 on a UE 702. As depicted in the diagram 700, the L-shaped antenna module 704 may be mounted on a long edge of the UE 702. As depicted in the diagram 700, the L-shaped antenna module 704 may include a first side 706 and a second side 708. The first side 706 and the second side 708 may be associated with different planes. In an example, the first side 706 and the second side 708 may be orthogonal to one another.

The first side 706 and the second side 708 of the L-shaped antenna module 704 may include antenna elements (illustrated in the diagram 700 as squares that include an "A" or an "I," where "A" stands for active and "I" stands for inactive). The antenna elements may be dual polarized. In a 2×2 configuration 710 illustrated in the diagram 700, two antenna elements from the first side 706 (indicated by "A" in the diagram 700) and two antenna elements from the second side 708 may be activated and combined for transmission/reception of data/signals and the remaining two antenna elements on each of the first side 706 and the second side 708 may remain inactive. In a 4×1 configuration 712 illustrated in the diagram 700, four antenna elements from the first side 706 (indicated by "A") may be activated and combined for transmission/reception of data/signals and four antenna elements from the second side 708 may remain inactive. In an example, power consumptions of the 2×2 configuration 710 and the 4×1 configuration 712 may be the same due to four antenna elements being activated and combined in each of the 2×2 configuration 710 and the 4×1 configuration 712. However, the 2×2 configuration 710 and the 4×1 configuration 712 may be associated with different antenna array gains. A decision as to which antenna elements are to be combined and across which polarizations may depend on a UE housing design, a channel structure, and/or polarization impairments.

Different antenna elements may become fully or partially blocked/obstructed as a user utilizes a UE. For instance, hands and/or fingers of the user may touch the UE which may cause the different antenna elements to be blocked/obstructed. A full or partial blockage/obstruction of antenna elements may be associated with reduced antenna array gain at the UE. Selecting antenna elements across the first side 706 and the second side 708 may be associated with increased antenna array gains when the antenna elements are fully or partially blocked/obstructed. Partially blocked/obstructed antenna elements may be associated with relatively higher gains.

In an example, when the antenna elements of the 2×2 configuration 710 and the 4×1 configuration 712 are not blocked, the 2×2 configuration 710 and the 4×1 configuration 712 may be associated with a similar or same antenna array gain over an angle of interest (e.g., 0° to 90°). In another example, when three antenna elements of the 2×2 configuration 710 and the 4×1 configuration 712 are blocked (i.e., a partial blockage), the 2×2 configuration 710 may be associated with an antenna array gain that is 2.4 dB greater than an antenna array gain associated with the 4×1 configuration 712 over the angle of interest. In yet another example, when all of the antenna elements of the 2×2 configuration 710 and the 4×1 configuration 712 are blocked (i.e., full blockage), the 2×2 configuration 710 may be associated with an antenna array gain that is 1.7 dB greater than an antenna array gain associated with the 4×1 configuration 712 over the angle of interest. In another example, the antenna array gain of the 2×2 configuration 710 and/or the 4×1 configuration 712 may change (e.g., increase or decrease) depending on the angle of interest and/or the type of blockage. In an example, different antenna elements from the first side 706 and the second side 708 may be selected and combined based on the type of blockage and the angle of interest.

As noted above, a UE may be configured with multiple antenna elements that may be selectively combined in order to increase gain associated with transmission/reception of data/signals. In an example, the multiple antenna elements may be located at different positions (e.g., different planes) in the UE. When the UE is held in the hands of a user, a portion of the antenna elements may become blocked. Blocked antenna elements may be associated with a reduction in antenna array gain, which may impact communications reliability at the UE. A UE may select different combinations of antenna elements to combine by performing signal quality measurements for each of the different combinations; however, performing signal quality measurements for the different combinations may be time consuming, may consume UE power, and/or may impact computational resources of the UE.

Various technologies pertaining to ML based antenna selection are described herein. In an example, a UE transmits a first indication of an obstruction of at least a portion of a plurality of antenna elements of the UE. The UE receives a second indication of at least two antenna elements of the plurality of antenna elements, where the second indication is based on the first indication and a set of usage patterns of a plurality of UEs. In an example, the second indication is based on an output of a ML model, where the ML model may utilize a crowdsourced approach for determining which antenna elements may be combined to achieve relatively high antenna array gains for communications at UEs. The UE combines the at least two antenna elements in the plurality of antenna elements based on the second indication. The UE transmits or receives first data or at least one signal via the combined at least two antenna elements. Vis-à-vis receiving the second indication of the at least two antenna elements, the UE may be able to combine antenna elements and transmit/receive data via the combined antenna elements in a manner associated with a relatively high antenna array gain and hence may improve communications reliability at the UE. Furthermore, the above-described technologies may reduce an amount of signal quality measurements performed by the UE and hence may be associated with reduced latency at the UE, reduced UE power consumption, and/or reduced usage of UE computational resources.

Figure 8:
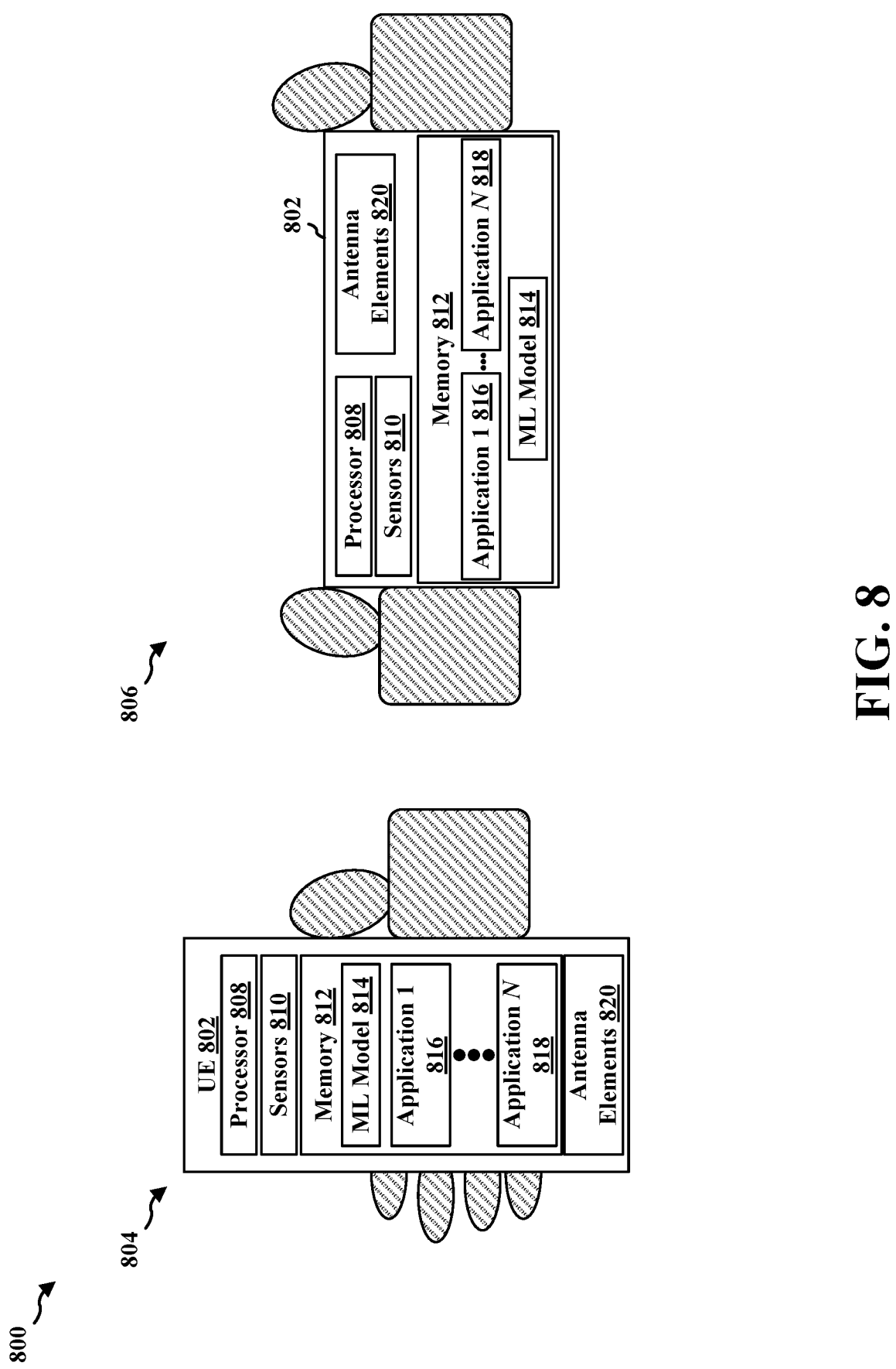
FIG. 8 is a diagram illustrating different manners of holding a UE.

FIG. 8 is a diagram 800 illustrating different manners of holding a UE 802. In an example, the UE 802 may be or include the UE 602 or the UE 702. The diagram 800 depicts a first orientation 804 of the UE 802 and a second orientation 806 of the UE 802. In the first orientation 804, a user may hold the UE 802 in a single hand (illustrated by diagonal lines in the diagram 800). In the second orientation 806, the user may hold the UE 802 in both hands (illustrated by diagonal lines in the diagram 800).

The UE 802 may include a processor 808. The UE 802 may include sensors 810. The sensors 810 may include camera(s), LIDAR sensors, radar sensors (e.g., frequency modulated continuous-wave radar (FMCW) radar), temperature sensors, force sensors, pressure sensors, an accelerometer, a Doppler sensor, and/or a fingerprint sensor.

The UE 802 may include memory 812. The memory 812 may include a ML model 814 that may include learned parameters (described in greater detail below). In an example, the learned parameters may be beam weights. In an example, the ML model 814 may be or include the AI/ML algorithm 400 described above in the description of FIG. 4. The AI/ML algorithm 400 may be based on AI/ML approaches. The ML model 814 may be for a user of the UE 802 or the ML model 814 may be a generalized model for a plurality of users. The UE 802 may include a first application 816 and a Nth application 818 that may be executed by the processor 808, where N is a positive integer greater than one. The first application 816 and the Nth application 818 may be collectively referred to as "the plurality of applications 816-818." The first application 816 and the Nth application 818 may be the same type of application or different types of applications. In an example, the first application 816 may be a first messaging application and the Nth application 818 may be a second messaging application. In another example, the first application 816 may be a messaging application and the Nth application 818 may be a video game. In an example, the user may hold the UE 802 in the first orientation 804 when the first application 816 is being used by the user and the user may hold the UE 802 in the second orientation 806 when the Nth application 818 is being used by the user. In a further example, the plurality of applications 816-818 may also include a phone/calling application, a texting application, and an application for downloading/uploading data.

The UE 802 may include antenna elements 820. In an example, the antenna elements 820 may be or include antenna elements of the first antenna module 604, the second antenna module 606, or the third antenna module 608, that is, the antenna elements 820 may be oriented on the UE 802 in the orientation depicted in the diagram 600. In another example, the antenna elements 820 may be the antenna elements of the L-shaped antenna module 704, that is, the antenna elements 820 may be oriented on the UE 802 in the orientation depicted in the diagram 700. In an example, the first orientation 804 may be associated with blockages of antenna elements associated with a left side and a right side of the UE 802. In an example, the second orientation 806 may be associated with blockages of antenna elements associated with a top and a bottom of the UE 802. Although not depicted in FIG. 8, the UE 802 may also include a display (e.g., a touchscreen display).

In one aspect, the UE 802 may determine common usage modes of the UE 802 by the user based on sensor data generated by the sensors 810 (e.g., sensor data generated by a FMCW radar, LIDAR data captured by a LIDAR sensor, an image captured by a camera, etc.) or ML techniques. The term "sensor data" may refer to data collective by sensors (e.g., the sensors 810). The UE 802 may also determine a granularity of a blockage of the UE 802 as the user holds the UE 802. In one aspect, the user can hold the UE 802 in different usage modes (e.g., in the first orientation 804 and the second orientation 806) such that the UE 802 may learn a selection of the antenna elements 820 based on hand(s) of the user, finger sizes of fingers of the user, positions of the fingers, and other properties of the user.

In one aspect, the UE 802 may obtain an indication that an application in the plurality of applications 816-818 is being executed or will be executed by the processor 808 of the UE 802. The UE 802 may generate sensor data using the sensors 810, where the sensor data may be indicative of an obstruction of some or all of the antenna elements 820. The obstruction may be hands and/or fingers of the user as the user holds the UE 802. The UE 802 may obtain an identifier for the application and/or the type of the application. The UE 802 may determine a type of the UE 802. The UE 802 may determine characteristics of antenna modules that include the antenna elements 820. The characteristics may include a number of antenna modules, a number of sides of each antenna module, a number of antenna elements within each antenna module, a number of antenna elements within each side of the antenna modules, an orientation of each antenna module on the UE 802, an arrangement (e.g., 2×2, 4×1, etc.) of antenna elements within each antenna module, and/or an arrangement of antenna elements within each side of each antenna module. The UE 802 may determine an identifier for the user of the UE 802.

The UE 802 may provide an indication of the obstruction, the identifier for the application, the type of the application, the type of the UE 802, the characteristics of the antenna modules, and/or the identifier for the user of the UE 802 as input to the ML model 814. The input to the ML model 814 may be a set of values. The UE 802 may select at least two antenna elements in the antenna elements 820 based on an output of the ML model 814. The output may be a value or a set of values. The output may be based on learned parameters of the ML model 814 and the input to the ML model 814. The at least two antenna elements may be located in the same side of an antenna module or on different sides of the antenna module. In an example, the at least two antenna elements may be the active antenna elements ("A") in the 2×2 configuration 710 or the active antenna elements ("A") in the 4×1 configuration 712.

The UE 802 may combine the at least two antenna elements in the antenna elements 820 based on the selection of the at least two antenna elements. In an example, the combined at least two antenna elements may be the active antenna elements ("A") in the 2×2 configuration 710 or the active antenna elements ("A") in the 4×1 configuration 712. The UE 802 may transmit or receive data and/or signals via the combined at least two antenna elements.

In some aspects, subsequent to transmitting or receiving the data/signals, the UE 802 may update the ML model 814. For instance, the UE 802 may perform antenna array gain measurements while the UE 802 is transmitting or receiving the data/signals via the combined at least two antenna elements. The UE 802 may update the learned parameters of the ML model 814 based on the antenna array gain measurements and at least one of the indication of the obstruction, the identifier for the application, the type of the application, the type of the UE 802, the characteristics of the antenna modules, and/or the identifier for the user. Updating the ML model 814 may include some or all of the aspects described in the description of FIG. 4.

Figure 9:
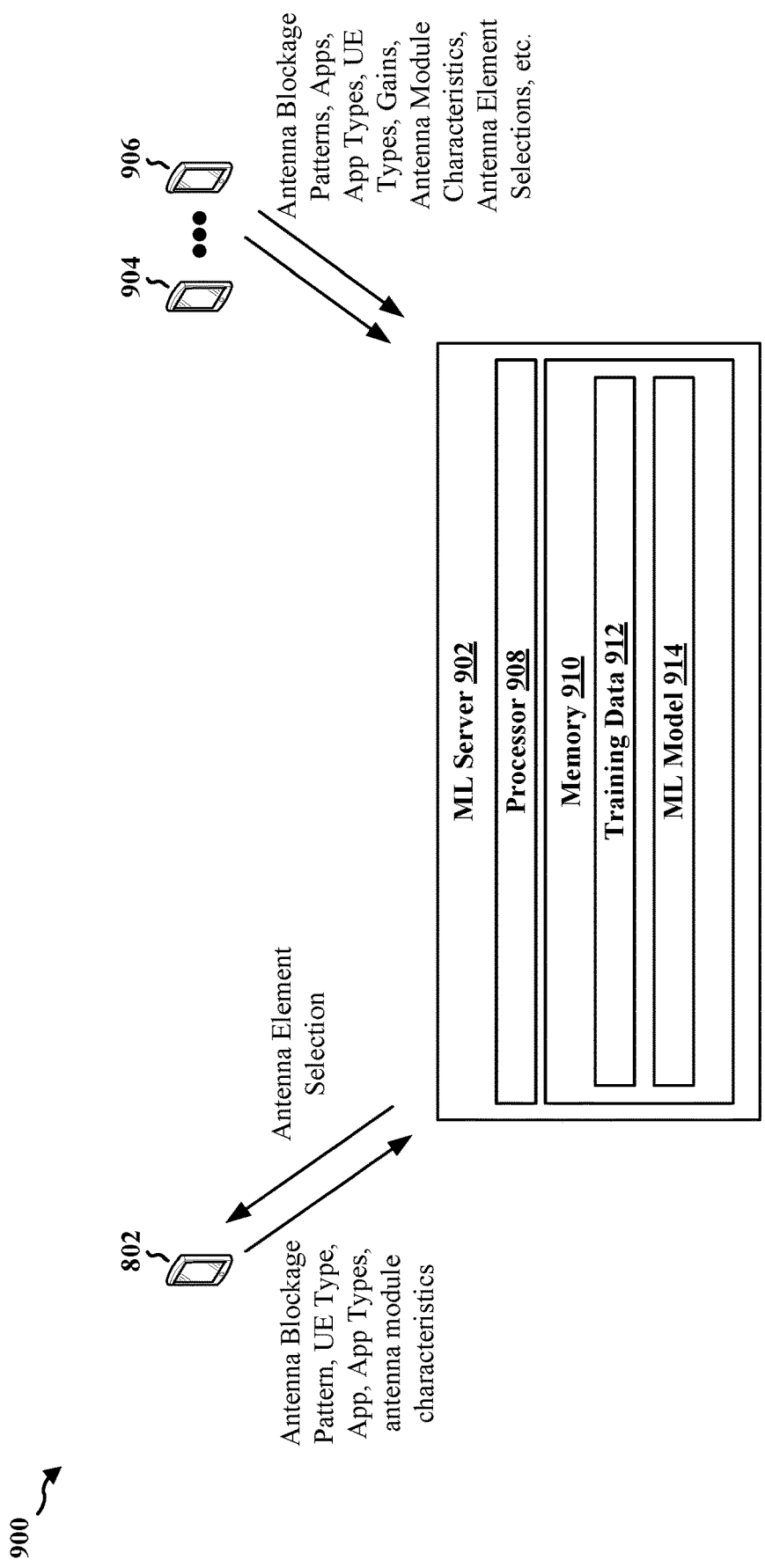
FIG. 9 is a diagram illustrating an example ML server and UEs.

FIG. 9 is a diagram 900 illustrating an example ML server 902 and UEs. The UEs may include the UE 802 described above in the description of the diagram 800. The UEs may also include a first UE 904 and an Mth UE 906, where M is a positive integer greater than one. The first UE 904 and the Mth UE 906 may be collectively referred to as "the plurality of UEs 904-906." The ML server 902 may include a processor 908 and a memory 910. The ML server 902 may be associated with a base station, a network node, a network entity, etc.

The ML server 902 may obtain (e.g., receive over a network connection) indications of obstructions (i.e., antenna blockage patterns) of the plurality of UEs 904-906 as the plurality of UEs 904-906 are being held by users, identifiers for applications being executed by the plurality of UEs 904-906 as the plurality of UEs 904-906 are being held by the users, identifiers for types of the applications being executed by the plurality of UEs 904-906 as the plurality of UEs 904-906 are being held by the users, types of the plurality of UEs 904-906 (e.g., smartphone, tablet, etc.), characteristics of antenna modules of the plurality of UEs 904-906 as the plurality of UEs 904-906 are being held by the users, indications of antenna elements being used by the plurality of UEs 904-906 for transmission/reception of data/signals while the plurality of UEs 904-906 are being held by the users, and antenna array gains associated with the antenna elements that are being used by the plurality of UEs 904-906 for transmission/reception of data/signals while the plurality of UEs 904-906 are being held by the users. The characteristics of the antenna modules may include the characteristics described above in the description of the diagram 800. The ML server 902 may store the aforementioned obtained data in the memory 910 as training data 912.

The ML server 902 may generate/train a ML model 914 based on the training data 912. In an example, the ML server 902 may perform some or all of the aspects described above in the description of FIG. 4 to train the ML model 914. The ML model 914 may include learned parameters based on the training data 912. The term "ML server" may refer to a node in a network where a ML model is learned. A ML server may or may not be part of a base station.

The UE 802 may obtain an indication that an application in the plurality of applications 816-818 is being executed or will be executed by the processor 808 of the UE 802. The UE 802 may generate sensor data using the sensors 810, where the sensor data may be indicative of an obstruction of some or all of the antenna elements 820. In an example, the application may be a new application that is being executed by the UE 802 for the first time. In another example, the application may be an application that has been previously executed by the UE 802. The obstruction may be hands and/or fingers of the user as the user holds the UE 802. The UE 802 may obtain an identifier for the application and/or the type of the application. The UE 802 may determine a type of the UE 802. The UE 802 may determine characteristics of antenna modules that include the antenna elements 820. The characteristics may include a number of antenna modules, a number of sides of each antenna module, a number of antenna elements within each antenna module, a number of antenna elements within each side of the antenna modules, an orientation of each antenna module on the UE 802, an arrangement (e.g., 2×2, 4×1, etc.) of antenna elements within each antenna module, and/or an arrangement of antenna elements within each side of each antenna module. The UE 802 may determine an identifier for the user of the UE 802.

The UE 802 may transmit an indication of the obstruction, the identifier for the application, the type of the application, the type of the UE 802, the characteristics of the antenna modules, and/or the identifier for the user of the UE 802 to the ML server 902. The ML server 902 may provide some or all of the aforementioned data as input to the ML model 914. The input to the ML model 914 may be a set of values associated with the aforementioned data. The ML server 902 may obtain an output that is indicative of at least two antenna elements in the antenna elements 820 based on learned parameters of the ML model 914 and the input. The output may be a value or a set of values.

The ML server 902 may transmit an indication of the at least two antenna elements to the UE 802. The UE 802 may combine the at least two antenna elements in the antenna elements 820 based on the indication of the at least two antenna elements. In an example, the combined at least two antenna elements may be the active antenna elements ("A") in the 2×2 configuration 710 or the active elements ("A") in the 4×1 configuration 712. The UE 802 may transmit or receive data and/or signals via the combined at least two antenna elements.

In some aspects, subsequent to transmitting the indication of the at least two antenna elements to the UE 802, the ML server 902 may update the ML model 914. For instance, the UE 802 may perform antenna array gain measurements while the UE 802 is transmitting or receiving the data/signals via the combined at least two antenna elements. The UE 802 may transmit in indication of the antenna array gain measurements to the ML server 902. The ML server 902 may update the learned parameters of the ML model 914 based on the antenna array gain measurements and at least one of the indication of the obstruction, the identifier for the application, the type of the application, the type of the UE 802, the characteristics of the antenna modules, and/or the identifier for the user. Updating the ML model 914 may include some or all of the aspects described in the description of FIG. 4.

Figure 10:
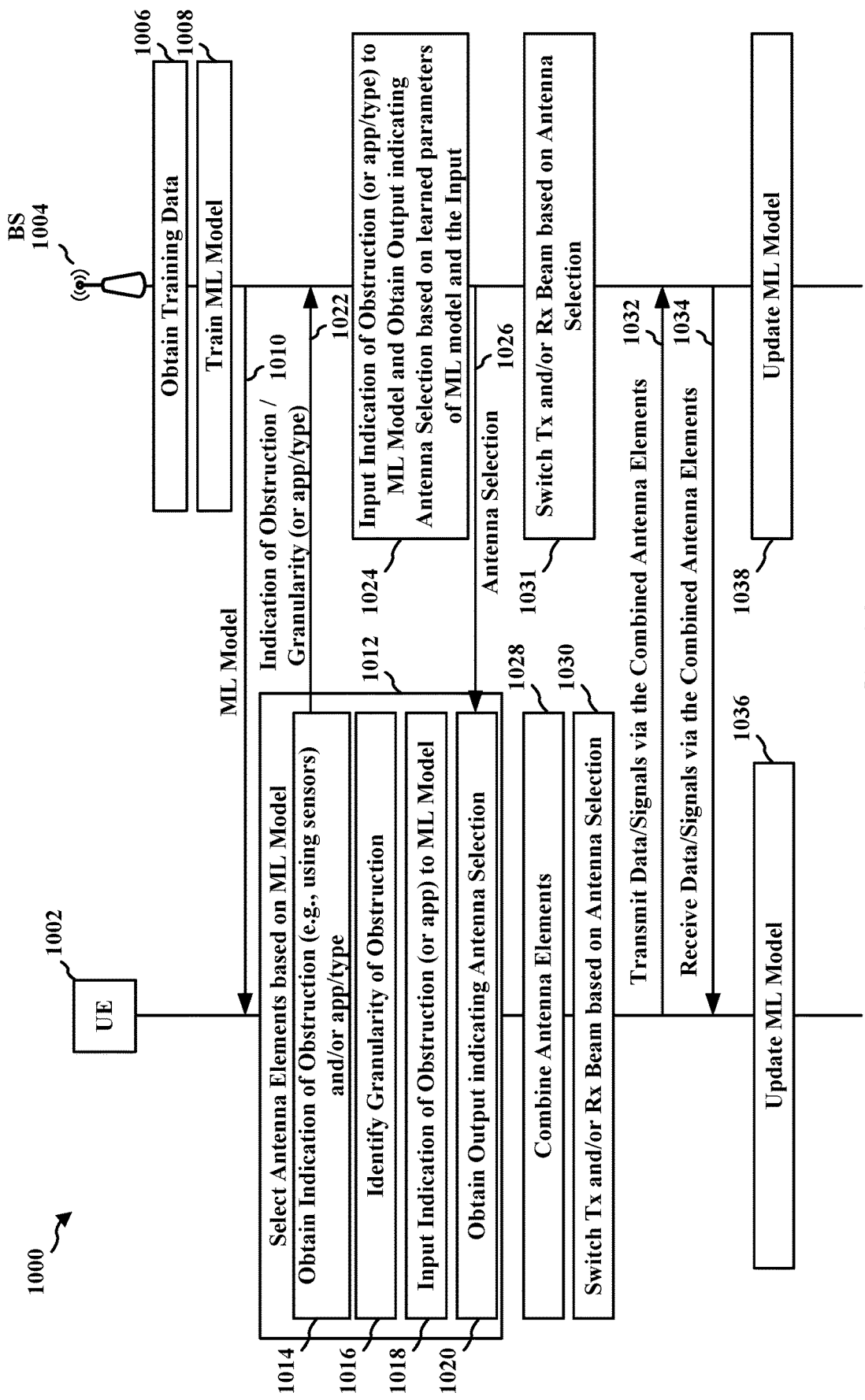
FIG. 10 is a diagram illustrating example communications between a UE and a base station.

FIG. 10 is a diagram 1000 illustrating example communications between a UE 1002 and a base station 1004. The UE 1002 may be or include the UE 104, the UE 350, the UE 602, the UE 702, the UE 802, or the apparatus 1504. The base station 1004 may be or include the base station 102, the base station 310, or the network entity 1602. The base station 1004 may be associated with the ML server 902.

At 1006, the base station 1004 may obtain training data. In an example, the training data may be associated with the plurality of UEs 904-906. The training data may include antenna blockage patterns of the plurality of UEs 904-906 as the plurality of UEs are held by the plurality of users while the plurality of UEs 904-906 are utilized by the plurality of users. The antenna blockage patterns may be determined based on sensor data generated by the plurality of UEs 904-906. The training data may include identifiers for applications being executed by the plurality of UEs 904-906 as the plurality of UEs 904-906 are being held by the plurality of users. The training data may include types of the applications being executed by the plurality of UEs 904-906 as the plurality of UEs 904-906 are being held by the plurality of users. The training data may include types of the plurality of UEs 904-906 (e.g., smartphone, tablet, etc.). The training data may include antenna element configurations of the plurality of UEs 904-906 as the plurality of UEs 904-906 are being held by the plurality of users. The antenna element configurations may indicate which antenna elements are activated and combined for the transmission/reception of data. In an example, the antenna element configurations may include the 2×2 configuration 710 and the 4×1 configuration 712 depicted in FIG. 7.

At 1008, the base station 1004 may train a ML model using the training data. The ML model may be or include the AI/ML algorithm 400, the ML model 814, or the ML model 914. Furthermore, the base station 1004 may train the ML model using some or all of the aspects described in the description of FIGS. 4, 8, and/or 9. The ML model may include learned parameters that are based on the training data. In an example in which the base station 1004 does not include a ML server, the base station 1004 may receive the ML model from the ML server.

In one aspect, at 1010, the UE 1002 may obtain the ML model from the base station 1004. In an example, the base station 1004 may transmit the ML model to the UE 1002 and the UE 1002 may receive the ML model from the base station 1004.

In one aspect, at 1012, the UE 1002 may select antenna elements (e.g., at least two antenna elements) from a plurality of antenna elements of the UE 1002 based on the ML model. In an example, the antenna elements may be antenna elements marked with "A" corresponding to the 2×2 configuration 710 or antenna elements marked with "A" corresponding to the 4×1 configuration 712.

For instance, at 1014, the UE 1002 may obtain an indication of an obstruction of the plurality of antenna elements using sensors of the UE 1002 and/or the UE 1002 may obtain an indication of an application that is to be executed or that is being executed by the UE 1002. The obstruction may be due to the UE 1002 being held by a user of the UE 1002. The obstruction may be hands and/or fingers of the user being physically placed on the UE 1002. In an example, the indication of the obstruction may be a set of values corresponding to the obstruction. At 1016, the UE 1002 may identify a granularity of the obstruction. At 1018, the UE 1002 may input the indication of the obstruction and/or the indication of the application to the ML model. The indication of the obstruction may include the granularity of the obstruction. The input to the ML model may also include an identifier for a type of the application, a type of the UE 1002, an identifier for a user of the UE 1002, and/or characteristics of antenna modules of the UE 1002. At 1020, the UE 1002 may obtain an output that is indicative of at least two selected antenna elements of the UE 1002. In an example, the output may be a value.

In another aspect, at 1022, the UE 1002 may transmit the indication of the obstruction/granularity and/or an indication of the application to the base station 1004. At 1024, the base station 1004 (e.g., via a ML server) may input the indication of the obstruction and/or the indication of the application to the ML model and the base station 1004 may obtain an output that is indicative of at least two selected antenna elements of the UE 1002. In an example, the output may be a value. The input to the ML model may also include an identifier for a type of the application, a type of the UE 1002, an identifier for a user of the UE 1002, and/or characteristics of antenna modules of the UE 1002. At 1026, the base station 1004 may transmit an indication of at least two selected antenna elements of the UE 1002. In an example in which the base station 1004 does not include a ML server, the base station 1004 may transmit the indication of the obstruction/granularity and/or an indication of the application to a ML server. The ML server may input the indication of the obstruction and/or the indication of the application to the ML model and the ML server may obtain the output that is indicative of the at least two selected antenna elements of the UE 1002. The ML server may transmit the output to the base station 1004 and the base station 1004 may transmit the antenna selection at 1026.

At 1028, the UE 1002 may combine the selected at least two antenna elements based on the indication received at 1026 or the output obtained at 1020. At 1030, the UE 1002 may switch a beam for data transmission/reception based on the at least two antenna elements. At 1031, the base station 1004 may switch a beam for data transmission/reception based on the at least two antenna elements.

At 1032, the UE 1002 may transmit data/signals via the combined at least two antenna elements. In an example, the UE 1002 may transmit a TCI state to the base station 1004. The term "TCI state" may refer to a beam index used at a base station. At 1034, the UE 1002 may receive data/signals via the combined at least two antenna elements. At 1036 the UE 1002 may update the ML model (e.g., using the processes described in the description of FIGS. 4 and/or 8). At 1038, the base station 1004 may update the ML model (e.g., using the processes described in the description of FIGS. 4 and/or 9). In an example in which a ML server is not located at the base station 1004, the base station 1004 may transmit data (e.g., data described in the description of FIGS. 4 and/or 9) to the ML server and the ML server may update the ML model based on the data.

Figure 11:
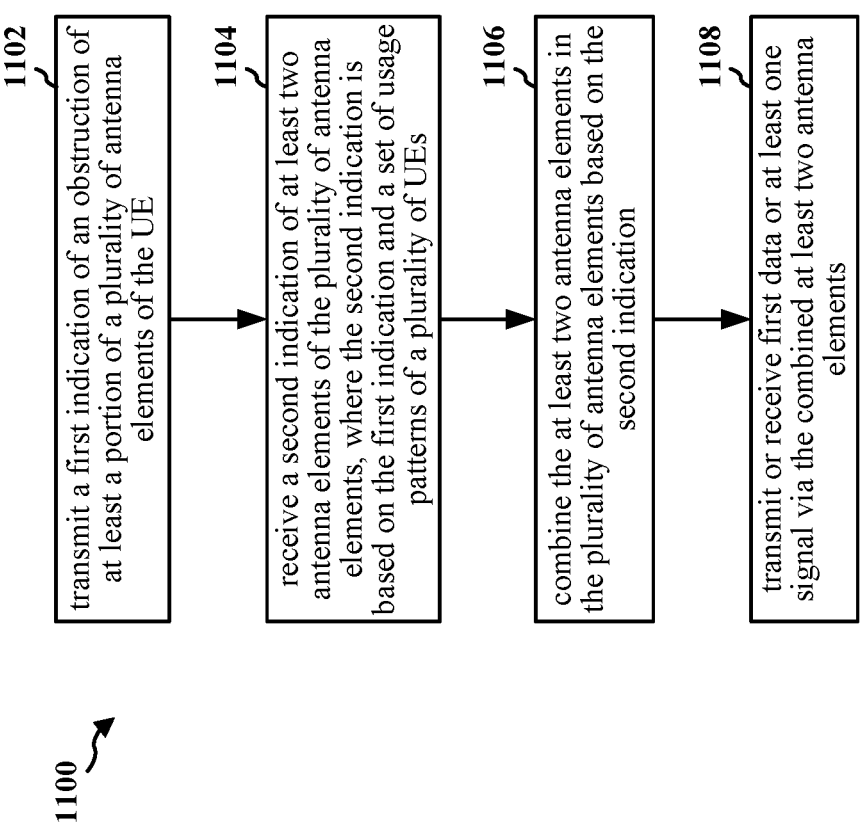
FIG. 11 is a flowchart of a method of wireless communication.

FIG. 11 is a flowchart 1100 of a method of wireless communication. The method may be performed by a UE (e.g., the UE 104, the UE 350, the UE 504, the UE 602, the UE 702, the UE 802, the UE 1002, the apparatus 1504). The method may be associated with various advantages at the UE, such as increased antenna array gain and increased communications reliability. In an example, the method may be performed by the antenna selection component 198.

At 1102, the UE transmits a first indication of an obstruction of at least a portion of a plurality of antenna elements of the UE. For example, FIG. 10 at 1022 shows that the UE 1002 may transmit an indication of an obstruction of at least a portion of a plurality of antenna elements of the UE 1002. In an example, the plurality of antenna elements may be the antenna elements depicted in the 2×2 configuration 710 or the 4×1 configuration 712. In another example, the antenna elements may be the antenna elements 820 of the UE 802. In a further example, the at least the portion of the plurality of antenna elements may be obstructed by the hand(s) depicted in FIG. 8. In another example, FIG. 9 shows that the UE 802 may transmit an antenna blockage pattern. In an example, 1102 may be performed by the antenna selection component 198.

At 1104, the UE receives a second indication of at least two antenna elements of the plurality of antenna elements, where the second indication is based on the first indication and a set of usage patterns of a plurality of UEs. For example, FIG. 10 at 1026 shows that the UE 1002 may receive an antenna selection (i.e., a second indication of at least two antenna elements of the plurality of antenna elements). In an example, the at least two antenna elements may be antenna elements from the 2×2 configuration 710 or the 4×1 configuration 712. In an example, the antenna selection may be based on the indication of the obstruction transmitted at 1022. In an example, the set of usage patterns may be usage patterns of the plurality of UEs 904-906. In another example, FIG. 9 shows that the UE 802 may receive an antenna element selection. In an example, 1104 may be performed by the antenna selection component 198.

At 1106, the UE combines the at least two antenna elements in the plurality of antenna elements based on the second indication. For example, FIG. 10 at 1028 shows that the UE 1002 may combine antenna elements (i.e., the at least two antenna elements) based on the antenna selection received at 1026. In an example, the UE may combine antenna elements indicated by "A" in the 2×2 configuration 710. In an example, the UE may combine antenna elements indicated by "A" in the 4×1 configuration 712. In an example, 1106 may be performed by the antenna selection component 198.

At 1108, the UE transmits or receives first data or at least one signal via the combined at least two antenna elements. For example, FIG. 10 at 1032 shows that the UE 1002 may transmit data/signals via the antenna elements combined at 1028. For example, FIG. 10 at 1034 shows that the UE 1002 may receive data/signals via the antenna elements combined at 1028. In an example, 1108 may be performed by the antenna selection component 198.

Figure 12:
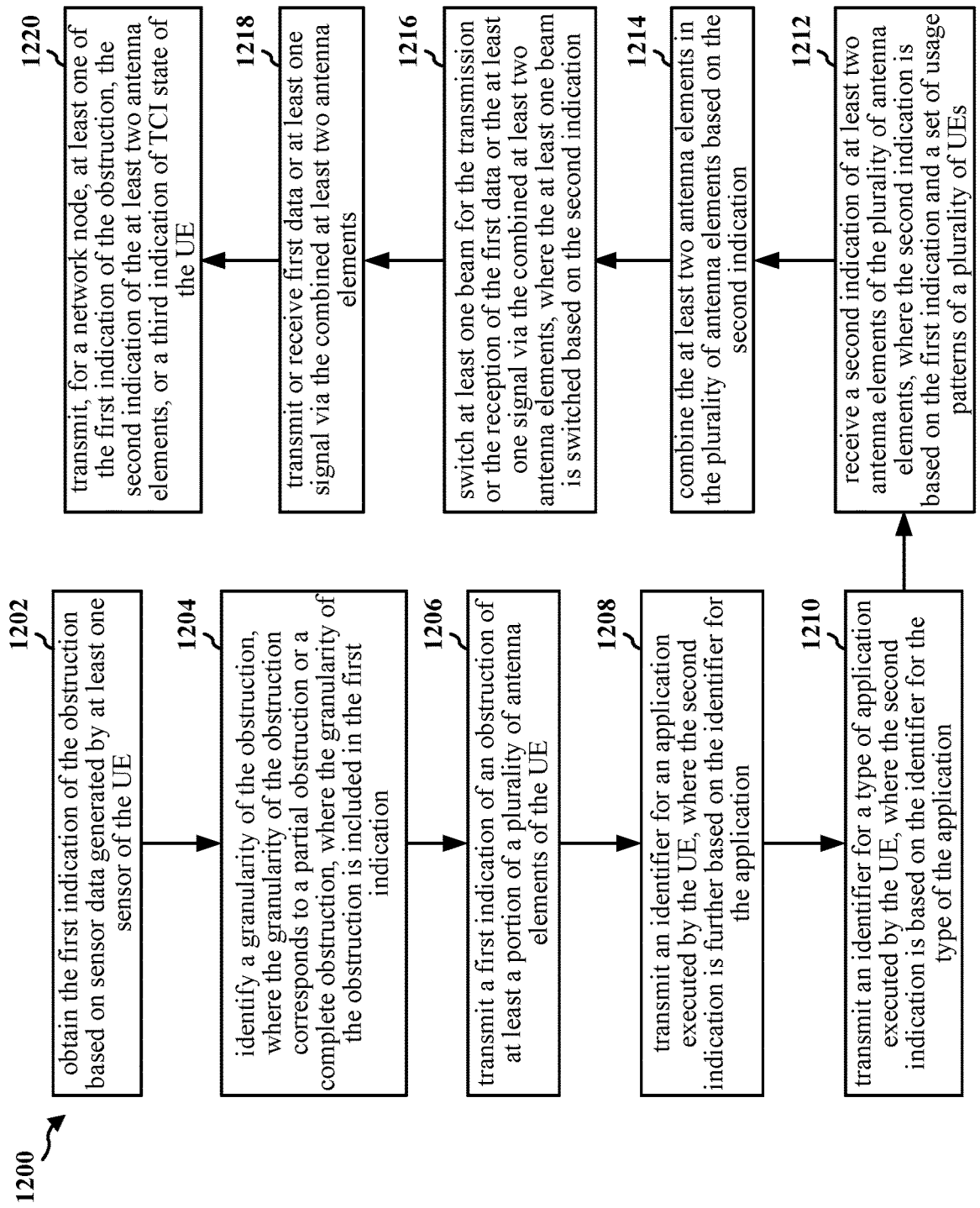
FIG. 12 is a flowchart of a method of wireless communication.

FIG. 12 is a flowchart 1200 of a method of wireless communication. The method may be performed by a UE (e.g., the UE 104, the UE 350, the UE 504, the UE 602, the UE 702, the UE 802, the UE 1002, the apparatus 1504). The method may be associated with various advantages at the UE, such as increased antenna array gain and increased communications reliability. In an example, the method (including the various aspects described below) may be performed by the antenna selection component 198.

At 1206, the UE transmits a first indication of an obstruction of at least a portion of a plurality of antenna elements of the UE. For example, FIG. 10 at 1022 shows that the UE 1002 may transmit an indication of an obstruction of at least a portion of a plurality of antenna elements of the UE 1002. In an example, the plurality of antenna elements may be the antenna elements depicted in the 2×2 configuration 710 or the 4×1 configuration 712. In another example, the antenna elements may be the antenna elements 820 of the UE 802. In a further example, the at least the portion of the plurality of antenna elements may be obstructed by the hand(s) depicted in FIG. 8. In another example, FIG. 9 shows that the UE 802 may transmit an antenna blockage pattern. In an example, 1206 may be performed by the antenna selection component 198.

At 1212, the UE receives a second indication of at least two antenna elements of the plurality of antenna elements, where the second indication is based on the first indication and a set of usage patterns of a plurality of UEs. For example, FIG. 10 at 1026 shows that the UE 1002 may receive an antenna selection (i.e., a second indication of at least two antenna elements of the plurality of antenna elements). In an example, the at least two antenna elements may be antenna elements from the 2×2 configuration 710 or the 4×1 configuration 712. In an example, the antenna selection may be based on the indication of the obstruction transmitted at 1022. In an example, the set of usage patterns may be usage patterns of the plurality of UEs 904-906. In another example, FIG. 9 shows that the UE 802 may receive an antenna element selection. In an example, 1212 may be performed by the antenna selection component 198.

At 1214, the UE combines the at least two antenna elements in the plurality of antenna elements based on the second indication. For example, FIG. 10 at 1028 shows that the UE 1002 may combine antenna elements (i.e., the at least two antenna elements) based on the antenna selection received at 1026. In an example, the UE may combine antenna elements indicated by "A" in the 2×2 configuration 710. In an example, the UE may combine antenna elements indicated by "A" in the 4×1 configuration 712. In an example, 1214 may be performed by the antenna selection component 198.

At 1218, the UE transmits or receives first data or at least one signal via the combined at least two antenna elements. For example, FIG. 10 at 1032 shows that the UE 1002 may transmit data/signals via the antenna elements combined at 1028. For example, FIG. 10 at 1034 shows that the UE 1002 may receive data/signals via the antenna elements combined at 1028. In an example, 1218 may be performed by the antenna selection component 198.

In one aspect, the plurality of antenna elements may include a first subset of antenna elements and a second subset of antenna elements, where each of the first subset of the antenna elements may be arranged in a first plane, where each of the second subset of the antenna elements may be arranged in a second plane that is different from the first plane, where the at least two antenna elements may include at least one first antenna element in the first subset of the antenna elements and at least one second antenna element in the second subset of the antenna elements. For example, the first subset of antenna elements may be antenna elements from the first side 706 of the L-shaped antenna module 704 and the second subset of antenna elements may be antenna elements from the second side 708 of the L-shaped antenna module 704. In an example, the first plane may correspond to the first side 706 and the second plane may correspond to the second side 708. In an example, the at least one first antenna element may be from the first side 706 and the at least one second antenna element may be from the second side 708. In another example, the at least one first antenna element may be from one side of the 2×2 configuration 710 and the at least one second antenna element may be from another side of the 2×2 configuration 710 as illustrated in FIG. 7. In yet another example, the at least one first antenna element may be from one side of the 4×1 configuration 712 and the at least one second antenna element may be from another side of the 4×1 configuration 712 as illustrated in FIG. 7.

In one aspect, at 1202, the UE may obtain the first indication of the obstruction based on sensor data generated by at least one sensor of the UE. For example, FIG. 10 at 1014 shows that the UE 1002 may obtain an indication of an obstruction using sensors. In an example, the at least one sensor of the UE may be or include the sensors 810 and the sensor data may be sensor data generated by the sensors 810. In an example, 1202 may be performed by the antenna selection component 198.

In one aspect, the at least one sensor of the UE may include: a radar, a camera, an accelerometer, a Doppler sensor, or a fingerprint sensor. For example, the sensors 810 may be or include a radar, a camera, an accelerometer, a Doppler sensor, or a fingerprint sensor.

In one aspect, the second indication may be based on an output of a ML model that includes one or more learned parameters, where the output of the ML model is based on the first indication and the one or more learned parameters, where the one or more learned parameters are based on the set of usage patterns of the plurality of UEs. For example, FIG. 10 at 1024 shows that the second indication may be based on an output of a ML model and that the output may be based on input to the ML model and learned parameters of the ML model. In an example, the ML model may be or include the ML model 914. In an example, the ML model may be or include some or all of the aspects discussed above with respect to FIG. 4.

In one aspect, the one or more learned parameters may be based on positions of body parts of a plurality of users as the plurality of UEs are held by the plurality of users in different positions. The body parts may include a part of a body of a user of a UE, such as one or more hands, fingers, etc. For example, the one or more learned parameters may be based on positions of body parts of a plurality of users as the plurality of UEs 904-906 are held by the plurality of users in different positions. In another example, the different positions may include the first orientation 804 and the second orientation 806 depicted in FIG. 8.

In one aspect, the one or more learned parameters may be based on positions of body parts of a plurality of users as the plurality of UEs are held by the plurality of users in different positions while the plurality of UEs execute a plurality of applications. For example, the one or more learned parameters may be based on positions of body parts of a plurality of users as the plurality of UEs 904-906 are held by the plurality of users in different positions. In another example, the different positions may include the first orientation 804 and the second orientation 806 depicted in FIG. 8. In an example, the plurality of applications may include the plurality of applications 816-818.

In one aspect, the first indication may be transmitted to an ML server associated with a ML model. For example, the base station 1004 may be associated with a ML server, such as the ML server 902. In an example, the indication of the obstruction transmitted at 1022 may be transmitted to the ML server 902.

In one aspect, the second indication may be received from the ML server associated with the ML model. For example, the base station 1004 may be associated with a ML server, such as the ML server 902. In an example, the antenna selection (i.e., the second indication) received at 1026 may be received from the ML server 902.

In one aspect, at 1208, the UE may transmit an identifier for an application executed by the UE, where the second indication may be further based on the identifier for the application. For example, FIG. 10 at 1022 shows that the UE 1002 may transmit an identifier for an application executed by the UE 1002. In a further example, FIG. 10 at 1024 shows that the antenna selection (i.e., the second indication) may be based on the identifier for the application. In another example, the application may be or include one or more of the plurality of applications 816-818. In another example, FIG. 9 shows that the UE 802 may transmit an identifier for an application. In an example, 1208 may be performed by the antenna selection component 198.

In one aspect, at 1210, the UE may transmit an identifier for a type of application executed by the UE, where the second indication may be based on the identifier for the type of the application. For example, FIG. 10 at 1022 shows that the UE 1002 may transmit an identifier for a type of application executed by the UE 1002. In a further example, FIG. 10 at 1024 shows that the antenna selection (i.e., the second indication) may be based on the identifier for the type of application. In another example, the type of application may be or include a type of one or more of the plurality of applications 816-818. In another example, FIG. 9 shows that the UE 802 may transmit an identifier for a type of application. In an example, 1210 may be performed by the antenna selection component 198.

In one aspect, at 1204, the UE may identify a granularity of the obstruction, where the granularity of the obstruction may correspond to a partial obstruction or a complete obstruction, where the granularity of the obstruction may be included in the first indication. The term "partial obstruction" may refer to a scenario in which a portion of antenna elements of a UE are blocked. The term "complete obstruction" may refer to a scenario in which each antenna of a UE is blocked. For example, FIG. 10 at 1016 shows that the UE 1002 may identify a granularity of an obstruction. In another example, FIG. 10 at 1022 shows that the indication of the obstruction may include the granularity of the obstruction. In another example, the partial obstruction may be a partial obstruction of the antenna elements of the 2×2 configuration 710 or the antenna elements of the 4×1 configuration 712 and the complete obstruction may be a complete obstruction of the antenna elements of the 2×2 configuration 710 or the antenna elements of the 4×1 configuration 712. In a further example, the partial obstruction or the complete obstruction may be due to positions of the hand(s) in the first orientation 804 or the second orientation 806. In an example, 1204 may be performed by the antenna selection component 198.

In one aspect, at 1216, the UE may switch at least one beam for the transmission or the reception of the first data or the at least one signal via the combined at least two antenna elements, where the at least one beam may be switched based on the second indication. For example, FIG. 10 at 1030 shows that the UE 1002 may switch a Tx and/or an Rx beam based on the antenna selection (i.e., the second indication) received at 1026. Switching the at least one beam for the transmission or the reception may include some or all of the aspects described in the description of FIG. 5. In an example, 1216 may be performed by the antenna selection component 198.

In one aspect, the at least two antenna elements may be for uplink communication or downlink communication. For example, the at least two antenna elements may be at least two of the antenna elements depicted in FIG. 7 and the least two of the antenna elements depicted in FIG. 7 may be for uplink communication or downlink communication.

In one aspect, the at least two antenna elements may include first at least two antenna elements if the at least two antenna elements are for the uplink communication, where the at least two antenna elements may include second at least two antenna elements if the at least two antenna elements for the downlink communication, where the first at least two antenna elements may be different from the second at least two antenna elements. For example, the antenna elements depicted in FIG. 7 may be or include the at least two antenna elements and the at least two antenna elements may include first at least two antenna elements if the at least two antenna elements are for the uplink communication, where the at least two antenna elements may include second at least two antenna elements if the at least two antenna elements for the downlink communication, where the first at least two antenna elements may be different from the second at least two antenna elements.

In one aspect, at 1220, the UE may transmit, for a network node, at least one of the first indication of the obstruction, the second indication of the at least two antenna elements, or a third indication of a TCI state of the UE. For example, FIG. 10 at 1032 shows that the UE 1002 may transmit data/signals and the data/signals may include at least one of the first indication of the obstruction, the second indication of the at least two antenna elements, or a third indication of a TCI state of the UE 1002. In an example, 1220 may be performed by the antenna selection component 198.

Figure 13:
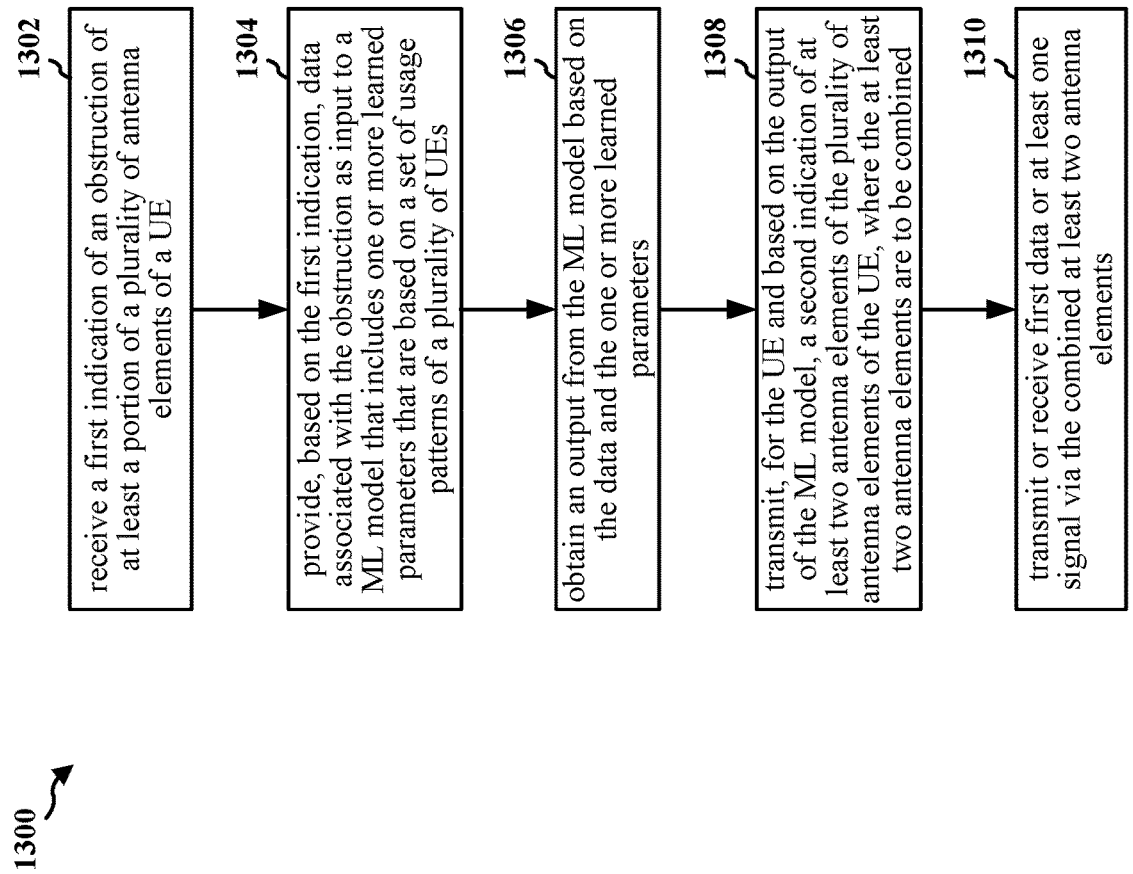
FIG. 13 is a flowchart of a method of wireless communication.

FIG. 13 is a flowchart 1300 of a method of wireless communication. The method may be performed by a network node (e.g., the base station 102, the base station 310, the base station 502, the base station 1004, the network entity 1602). The method may also be performed by the ML server 902. The method may be associated with various advantages at the network node, such as increased communications reliability with UEs. In an example, the method may be performed by the antenna selection component 199.

At 1302, the network node receives a first indication of an obstruction of at least a portion of a plurality of antenna elements of a UE. For example, FIG. 10 at 1022 shows that the base station 1004 may receive an indication of an obstruction of at least a portion of a plurality of antenna elements of the UE 1002. In an example, the plurality of antenna elements may be the antenna elements depicted in the 2×2 configuration 710 or the 4×1 configuration 712. In another example, the antenna elements may be the antenna elements 820 of the UE 802. In a further example, the at least the portion of the plurality of antenna elements may be obstructed by the hand(s) depicted in FIG. 8. In another example, FIG. 9 shows that the ML server 902 may receive an antenna blockage pattern. In an example, 1302 may be performed by the antenna selection component 199.

At 1304, the network node provides, based on the first indication, data associated with the obstruction as input to a ML model that includes one or more learned parameters that are based on a set of usage patterns of a plurality of UEs. For example, FIG. 10 at 1024 shows that the base station 1004 may input the indication of the obstruction to a ML model that includes learned parameters. In an example, the set of usage patterns may be usage patterns of the plurality of UEs 904-906. In an example, the ML model may be the ML model 914. In another example, the ML model may be or include some or all of the aspects described in the description of FIG. 4. In an example, 1304 may be performed by the antenna selection component 199.

At 1306, the network node obtains an output from the ML model based on the data and the one or more learned parameters. For example, FIG. 10 at 1024 shows that the base station 1004 may obtain an output from the ML model based on the learned parameters and the input to the ML model. In an example, 1306 may be performed by the antenna selection component 199.

At 1308, the network node transmits, for the UE and based on the output of the ML model, a second indication of at least two antenna elements of the plurality of antenna elements of the UE, where the at least two antenna elements are to be combined. For example, FIG. 10 at 1026 shows that the base station 1004 may transmit an antenna selection (i.e., a second indication of at least two antenna elements of the plurality of antenna elements). In an example, the at least two antenna elements may be antenna elements from the 2×2 configuration 710 or the 4×1 configuration 712. In an example, the antenna selection may be based on the indication of the obstruction received at 1022. In an example, the set of usage patterns may be usage patterns of the plurality of UEs 904-906. In another example, FIG. 9 shows that the ML server 902 may transmit an antenna element selection. In an example, antenna elements indicated by "A" in the 2×2 configuration 710 may be combined. In an example, antenna elements indicated by "A" in the 4×1 configuration 712 may be combined. In an example, 1308 may be performed by the antenna selection component 199.

At 1310, the network node transmits or receives first data or at least one signal via the combined at least two antenna elements. For example, FIG. 10 at 1032 shows that the base station 1004 may receive data/signals via the antenna elements combined at 1028. For example, FIG. 10 at 1034 shows that the base station 1004 may transmit data/signals via the antenna elements combined at 1028. In an example, 1310 may be performed by the antenna selection component 199.

Figure 14:
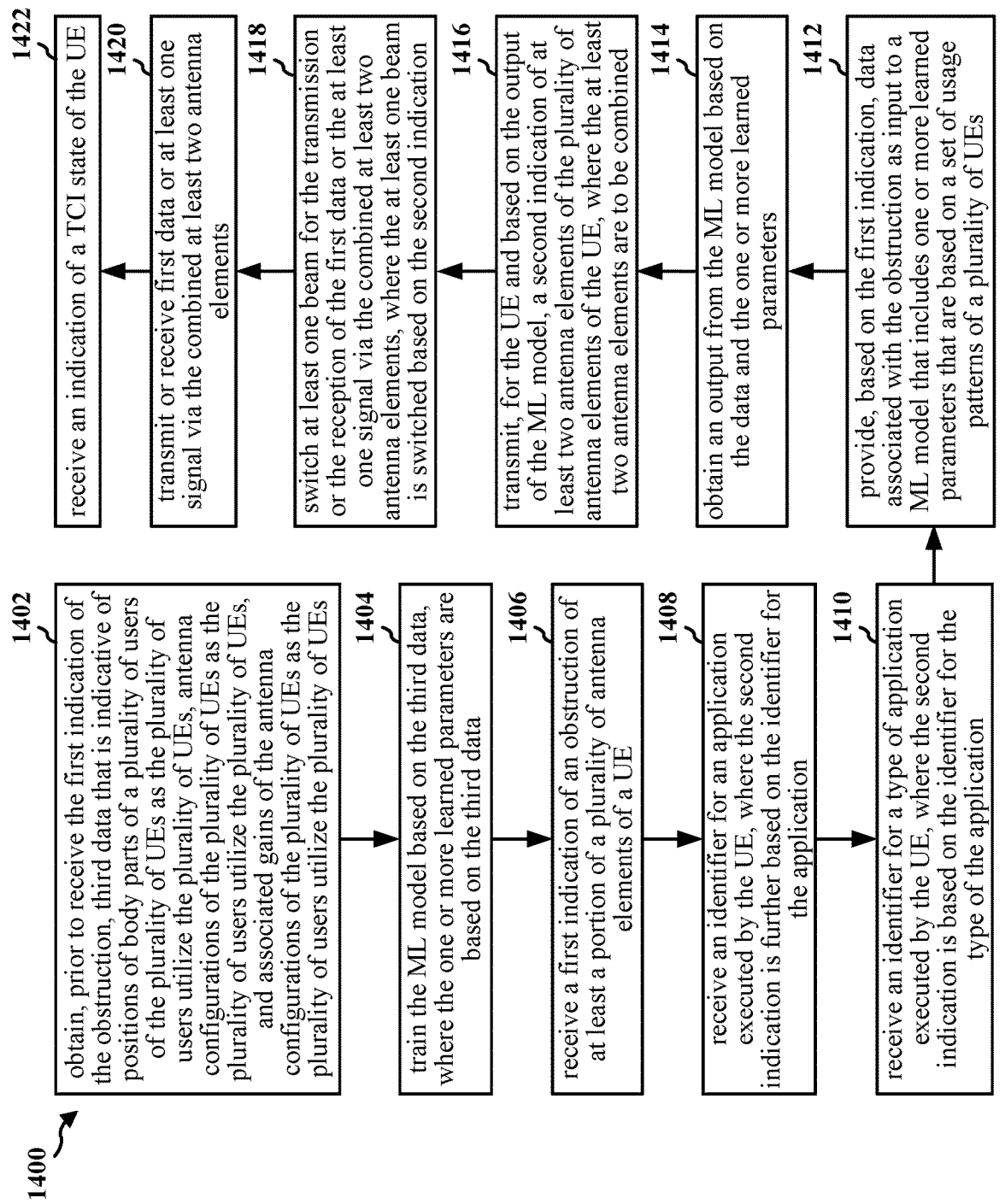
FIG. 14 is a flowchart of a method of wireless communication.

FIG. 14 is a flowchart 1400 of a method of wireless communication. The method may be performed by a network node (e.g., the base station 102, the base station 310, the base station 502, the base station 1004, the network entity 1602). The method may also be performed by the ML server 902. The method may be associated with various advantages at the network node, such as increased communications reliability with UEs. In an example, the method (including the various aspects described below) may be performed by the antenna selection component 199.

At 1406, the network node receives a first indication of an obstruction of at least a portion of a plurality of antenna elements of a UE. For example, FIG. 10 at 1022 shows that the base station 1004 may receive an indication of an obstruction of at least a portion of a plurality of antenna elements of the UE 1002. In an example, the plurality of antenna elements may be the antenna elements depicted in the 2×2 configuration 710 or the 4×1 configuration 712. In another example, the antenna elements may be the antenna elements 820 of the UE 802. In a further example, the at least the portion of the plurality of antenna elements may be obstructed by the hand(s) depicted in FIG. 8. In another example, FIG. 9 shows that the ML server 902 may receive an antenna blockage pattern. In an example, 1406 may be performed by the antenna selection component 199.

At 1412, the network node provides, based on the first indication, data associated with the obstruction as input to a ML model that includes one or more learned parameters that are based on a set of usage patterns of a plurality of UEs. For example, FIG. 10 at 1024 shows that the base station 1004 may input the indication of the obstruction to a ML model that includes learned parameters. In an example, the set of usage patterns may be usage patterns of the plurality of UEs 904-906. In an example, the ML model may be the ML model 914. In another example, the ML model may be or include some or all of the aspects described in the description of FIG. 4. In an example, 1412 may be performed by the antenna selection component 199.

At 1414, the network node obtains an output from the ML model based on the data and the one or more learned parameters. For example, FIG. 10 at 1024 shows that the base station 1004 may obtain an output from the ML model based on the learned parameters and the input to the ML model. In an example, 1414 may be performed by the antenna selection component 199.

At 1416, the network node transmits, for the UE and based on the output of the ML model, a second indication of at least two antenna elements of the plurality of antenna elements of the UE, where the at least two antenna elements are to be combined. For example, FIG. 10 at 1026 shows that the base station 1004 may transmit an antenna selection (i.e., a second indication of at least two antenna elements of the plurality of antenna elements). In an example, the at least two antenna elements may be antenna elements from the 2×2 configuration 710 or the 4×1 configuration 712. In an example, the antenna selection may be based on the indication of the obstruction received at 1022. In an example, the set of usage patterns may be usage patterns of the plurality of UEs 904-906. In another example, FIG. 9 shows that the ML server 902 may transmit an antenna element selection. In an example, antenna elements indicated by "A" in the 2×2 configuration 710 may be combined. In an example, antenna elements indicated by "A" in the 4×1 configuration 712 may be combined. In an example, 1416 may be performed by the antenna selection component 199.

At 1420, the network node transmits or receives first data or at least one signal via the combined at least two antenna elements. For example, FIG. 10 at 1032 shows that the base station 1004 may receive data/signals via the antenna elements combined at 1028. For example, FIG. 10 at 1034 shows that the base station 1004 may transmit data/signals via the antenna elements combined at 1028. In an example, 1420 may be performed by the antenna selection component 199.

In one aspect, the plurality of antenna elements may include a first subset of antenna elements and a second subset of antenna elements, where each of the first subset of the antenna elements may be arranged in a first plane, where each of the second subset of the antenna elements may be arranged in a second plane that is different from the first plane, where the at least two antenna elements may include at least one first antenna element in the first subset of the antenna elements and at least one second antenna element in the second subset of the antenna elements. For example, the first subset of antenna elements may be antenna elements from the first side 706 of the L-shaped antenna module 704 and the second subset of antenna elements may be antenna elements from the second side 708 of the L-shaped antenna module 704. In an example, the first plane may correspond to the first side 706 and the second plane may correspond to the second side 708. In an example, the at least one first antenna element may be from the first side 706 and the at least one second antenna element may be from the second side 708. In another example, the at least one first antenna element may be from one side of the 2×2 configuration 710 and the at least one second antenna element may be from another side of the 2×2 configuration 710 as illustrated in FIG. 7. In yet another example, the at least one first antenna element may be from one side of the 4×1 configuration 712 and the at least one second antenna element may be from another side of the 4×1 configuration 712 as illustrated in FIG. 7.

In one aspect, the one or more learned parameters may be based on positions of body parts of a plurality of users as the plurality of UEs are held by the plurality of users in different positions. For example, the one or more learned parameters may be based on positions of body parts of a plurality of users as the plurality of UEs 904-906 are held by the plurality of users in different positions. In another example, the different positions may include the first orientation 804 and the second orientation 806 depicted in FIG. 8.

In one aspect, the one or more learned parameters may be based on positions of body parts of a plurality of users as the plurality of UEs are held by the plurality of users in different positions while the plurality of UEs execute a plurality of applications. For example, the one or more learned parameters may be based on positions of body parts of a plurality of users as the plurality of UEs 904-906 are held by the plurality of users in different positions. In another example, the different positions may include the first orientation 804 and the second orientation 806 depicted in FIG. 8. In an example, the plurality of applications may include the plurality of applications 816-818.

In one aspect, the network node may be associated with a ML server. For example, the network node may be associated with the ML server 902.

In one aspect, at 1408, the network node may receive an identifier for an application executed by the UE, where the second indication may be further based on the identifier for the application. For example, FIG. 10 at 1022 shows that the base station 1004 may receive an identifier for an application executed by the UE 1002. In a further example, FIG. 10 at 1024 shows that the antenna selection (i.e., the second indication) may be based on the identifier for the application. In another example, the application may be or include one or more of the plurality of applications 816-818. In another example, FIG. 9 shows that the ML server 902 may receive an identifier for an application. In an example, 1408 may be performed by the antenna selection component 198.

In one aspect, at 1410, the network node may receive an identifier for a type of application executed by the UE, where the second indication may be based on the identifier for the type of the application. For example, FIG. 10 at 1022 shows that the base station 1004 may receive an identifier for a type of application executed by the UE 1002. In a further example, FIG. 10 at 1024 shows that the antenna selection (i.e., the second indication) may be based on the identifier for the type of application. In another example, the type of the application may be or include a type of one or more of the plurality of applications 816-818. In another example, FIG. 9 shows that the ML server 902 may receive an identifier for a type of application. In an example, 1410 may be performed by the antenna selection component 198.

In one aspect, the first indication may include an indication of a granularity of the obstruction, where the second indication may be further based on the indication of the granularity of the obstruction. For example, FIG. 10 at 1022 shows that the indication of the obstruction may include the granularity of the obstruction. For example, FIG. 10 at 1024 shows that the antenna selection (i.e., the second indication) may be based on the granularity of the obstruction. In an example, the obstruction may be an obstruction of antenna elements of the 2×2 configuration 710 or the 4×1 configuration 712.

In one aspect, at 1418, the network node may switch at least one beam for the transmission or the reception of the first data or the at least one signal via the combined at least two antenna elements, where the at least one beam may be switched based on the second indication. For example, FIG. 10 at 1031 shows that the base station 1004 may switch a Tx and/or an Rx beam based on the antenna selection (i.e., the second indication) transmitted at 1026. Switching the at least one beam for the transmission or the reception may include some or all of the aspects described in the description of FIG. 5. In an example, switching the at least one beam for the transmission or the reception of the first data or the at least one signal may be based on a TCI state received from a UE. In an example, 1418 may be performed by the antenna selection component 198.

In one aspect, the at least two antenna elements may be for uplink communication or downlink communication. For example, the at least two antenna elements may be at least two of the antenna elements depicted in FIG. 7 and the least two of the antenna elements depicted in FIG. 7 may be for uplink communication or downlink communication.

In one aspect, the at least two antenna elements may include first at least two antenna elements if the at least two antenna elements are for the uplink communication, where the at least two antenna elements may include second at least two antenna elements if the at least two antenna elements for the downlink communication, where the first at least two antenna elements may be different from the second at least two antenna elements. For example, the antenna elements depicted in FIG. 7 may be or include the at least two antenna elements and the at least two antenna elements may include first at least two antenna elements if the at least two antenna elements are for the uplink communication, where the at least two antenna elements may include second at least two antenna elements if the at least two antenna elements for the downlink communication, where the first at least two antenna elements may be different from the second at least two antenna elements.

In one aspect, at 1422, the network node may receive an indication of a TCI state of the UE. For example, FIG. 10 at 1032 shows that the base station 1004 may receive data/signals and the data/signals may include a TCI state of the UE 1002. In an example, 1422 may be performed by the antenna selection component 199.

In one aspect, at 1402, the network node may obtain, prior to receive the first indication of the obstruction, third data that is indicative of positions of body parts of a plurality of users of the plurality of UEs as the plurality of users utilize the plurality of UEs, antenna configurations of the plurality of UEs as the plurality of users utilize the plurality of UEs, and associated gains of the antenna configurations of the plurality of UEs as the plurality of users utilize the plurality of UEs. For example, FIG. 10 shows at 1006 that the base station 1004 may obtain training data prior to receiving the indication of the obstruction at 1022. The training data may be indicative of positions of body parts of a plurality of users of the plurality of UEs as the plurality of users utilize the plurality of UEs, antenna configurations of the plurality of UEs as the plurality of users utilize the plurality of UEs, and associated gains of the antenna configurations of the plurality of UEs as the plurality of users utilize the plurality of UEs. In an example, the plurality of UEs may be or include the plurality of UEs 904-906. In an example, the third data may be or include the training data 912. In another example, FIG. 9 shows that the ML server 902 may receive antenna blockage patterns of the plurality of UEs 904-906, antenna module characteristics of the plurality of UEs 904-906, and gains of the plurality of UEs 904-906. In another example, the positions of the body parts may be or include the hand(s) on the UE 802 as illustrated in the first orientation 804 and/or the second orientation 806 depicted in FIG. 8. In an example, 1402 may be performed by the antenna selection component 199.

In one aspect, at 1404, the network node may train the ML model based on the third data, where the one or more learned parameters are based on the third data. For example, FIG. 10 at 1008 shows that the base station 1004 may train the ML model based on the training data obtained at 1006. In an example, training the ML model may include some or all of the aspects described above in the description of FIG. 4. In an example, 1404 may be performed by the antenna selection component 199.

In one aspect, the third data may be further indicative of applications executed by the plurality of UEs as the plurality of users utilize the plurality of UEs or types of the applications executed by the plurality of UEs as the plurality of users utilize the plurality of UEs. For example, FIG. 9 shows that the training data 912 (i.e., the third data) may be indicative of applications (or types of application) executed by the plurality of UEs 904-906 as the plurality of users utilize the plurality of UEs 904-906. In an example, the applications may be or include the plurality of applications 816-818, that is, the plurality of UEs 904-906 may execute separate instances of the plurality of applications 816-818.

Figure 15:
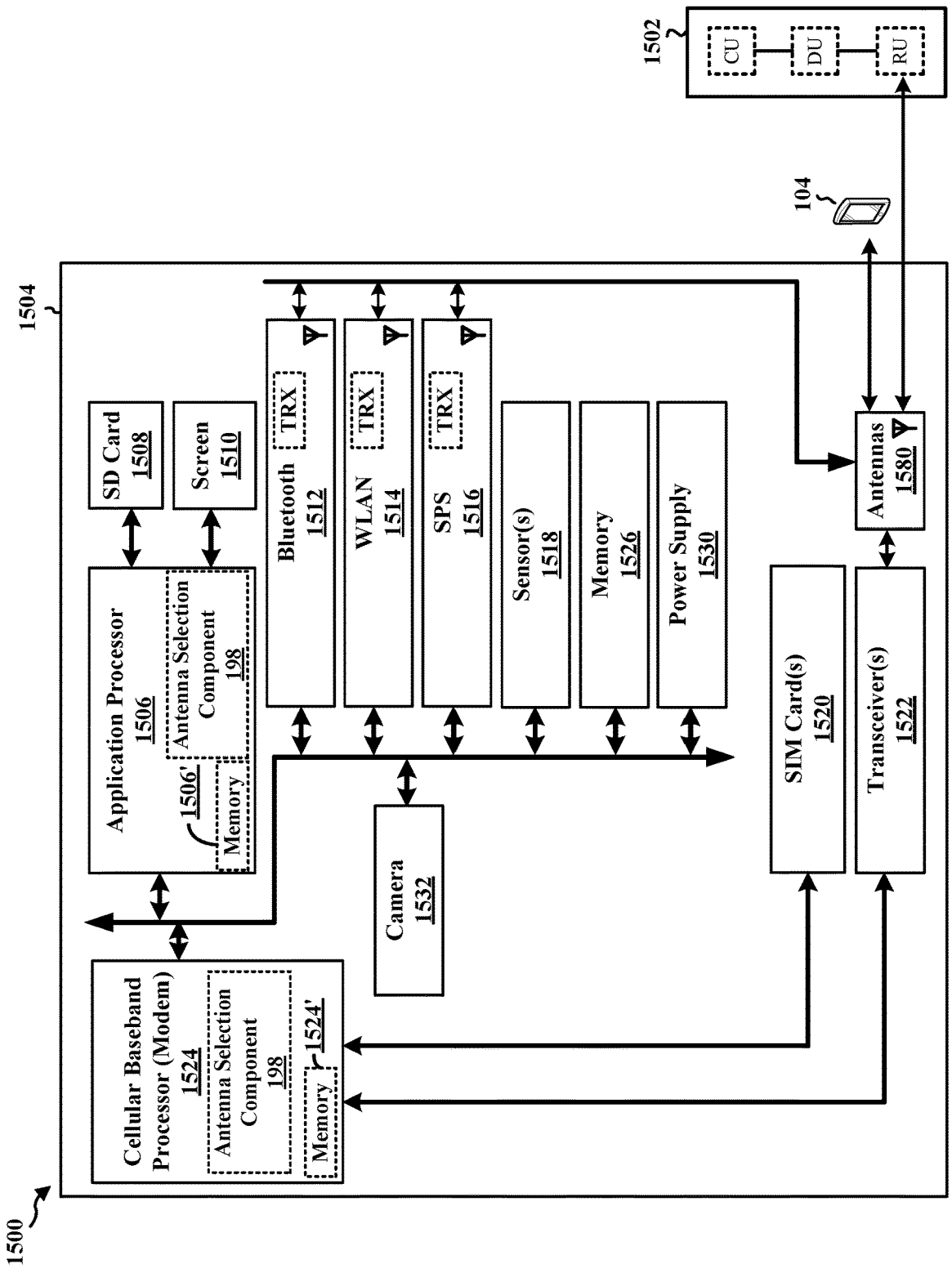
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 350 of FIG. 3) and include the additional modules of the apparatus 1504.

As discussed supra, the antenna selection component 198 is configured to transmit a first indication of an obstruction of at least a portion of a plurality of antenna elements of the UE. The antenna selection component 198 is configured to receive a second indication of at least two antenna elements of the plurality of antenna elements, where the second indication is based on the first indication and a set of usage patterns of a plurality of UEs. The antenna selection component 198 is configured to combine the at least two antenna elements in the plurality of antenna elements based on the second indication. The antenna selection component 198 is configured to transmit or receive first data or at least one signal via the combined at least two antenna elements. The antenna selection component 198 may be configured to obtain the first indication of the obstruction based on sensor data generated by at least one sensor of the UE. The antenna selection component 198 may be configured to transmit an identifier for an application executed by the UE, where the second indication is further based on the identifier for the application. The antenna selection component 198 may be configured to transmit an identifier for a type of application executed by the UE, where the second indication is based on the identifier for the type of the application. The antenna selection component 198 may be configured to identify a granularity of the obstruction, where the granularity of the obstruction corresponds to a partial obstruction or a complete obstruction, where the granularity of the obstruction is included in the first indication. The antenna selection component 198 may be configured to switch at least one beam for the transmission or the reception of the first data or the at least one signal via the combined at least two antenna elements, where the at least one beam is switched based on the second indication. The antenna selection component 198 may be configured to transmit, for a network node, at least one of the first indication of the obstruction, the second indication of the at least two antenna elements, or a third indication of a TCI state of the UE. The antenna selection component 198 may be within the cellular baseband processor 1524, the application processor 1506, or both the cellular baseband processor 1524 and the application processor 1506. The antenna selection component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for transmitting a first indication of an obstruction of at least a portion of a plurality of antenna elements of the UE. In one configuration, the apparatus 1504, and in particular the cellular baseband processor 1524 and/or the application processor 1506, includes means for receiving a second indication of at least two antenna elements of the plurality of antenna elements, where the second indication is based on the first indication and a set of usage patterns of a plurality of UEs. In one configuration, the apparatus 1504, and in particular the cellular baseband processor 1524 and/or the application processor 1506, includes means for combining the at least two antenna elements in the plurality of antenna elements based on the second indication. In one configuration, the apparatus 1504, and in particular the cellular baseband processor 1524 and/or the application processor 1506, includes means for transmitting or receiving first data or at least one signal via the combined at least two antenna elements. In one configuration, the apparatus 1504, and in particular the cellular baseband processor 1524 and/or the application processor 1506, may include means for obtaining the first indication of the obstruction based on sensor data generated by at least one sensor of the UE. In one configuration, the apparatus 1504, and in particular the cellular baseband processor 1524 and/or the application processor 1506, may include means for transmitting an identifier for an application being executed by the UE, where the second indication is further based on the identifier for the application. In one configuration, the apparatus 1504, and in particular the cellular baseband processor 1524 and/or the application processor 1506, may include means for transmitting an identifier for a type of application being executed by the UE, where the second indication is based on the identifier for the type of the application. In one configuration, the apparatus 1504, and in particular the cellular baseband processor 1524 and/or the application processor 1506, may include means for identifying a granularity of the obstruction, where the granularity of the obstruction corresponds to a partial obstruction or a complete obstruction, where the granularity of the obstruction is included in the first indication. In one configuration, the apparatus 1504, and in particular the cellular baseband processor 1524 and/or the application processor 1506, may include means for switching at least one beam for the transmission or the reception of the first data or the at least one signal via the combined at least two antenna elements, where the at least one beam is switched based on the second indication. In one configuration, the apparatus 1504, and in particular the cellular baseband processor 1524 and/or the application processor 1506, may include means for transmitting, for a network node, at least one of the first indication of the obstruction, the second indication of the at least two antenna elements, or a third indication of a TCI state of the UE. The means may be the antenna selection component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
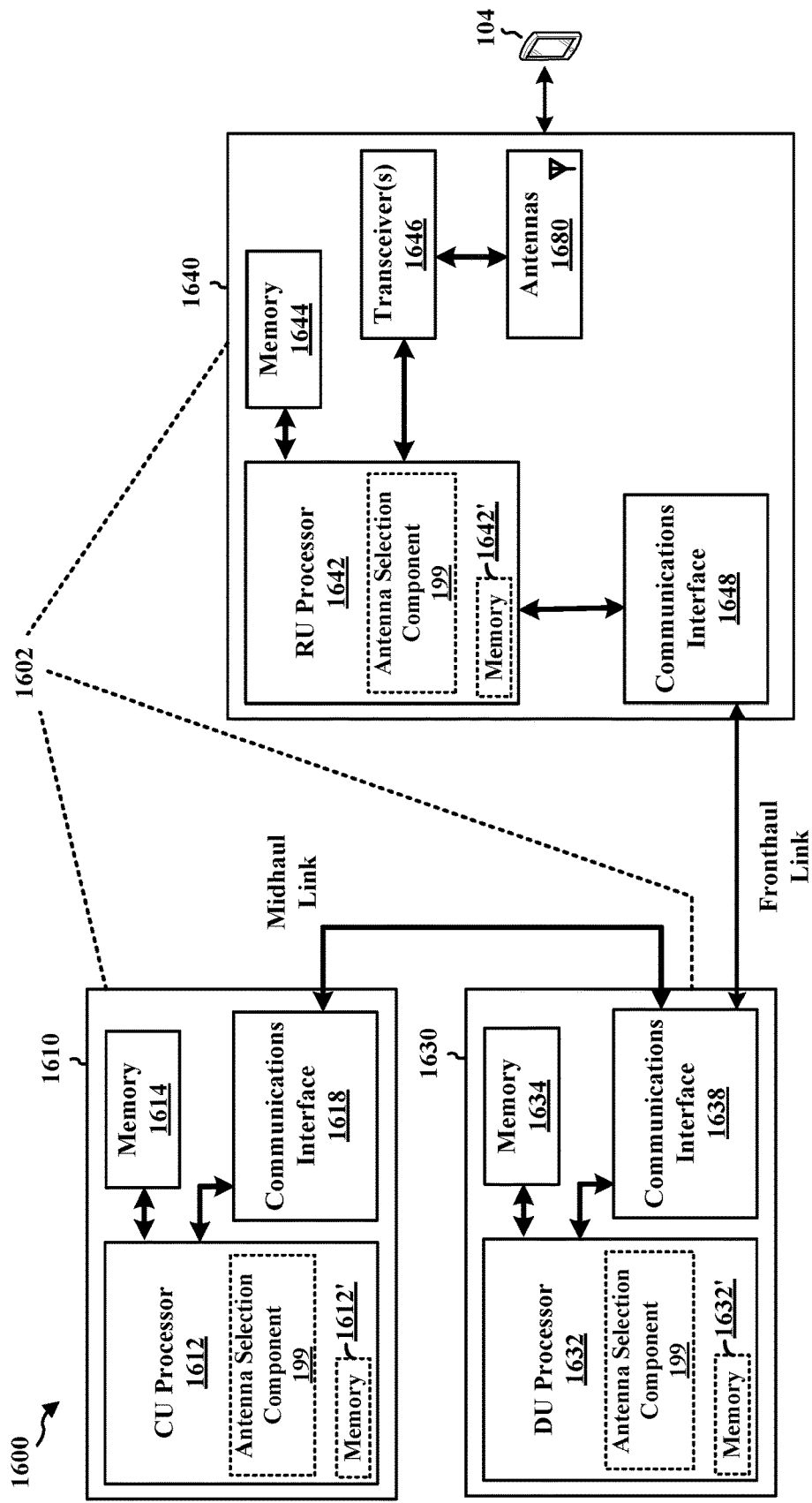
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the antenna selection component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the antenna selection component 199 is configured to receive a first indication of an obstruction of at least a portion of a plurality of antenna elements of a UE. The antenna selection component 199 is configured to provide, based on the first indication, data associated with the obstruction as input to a ML model that includes one or more learned parameters that are based on a set of usage patterns of a plurality of UEs. The antenna selection component 199 is configured to obtain an output from the ML model based on the data and the one or more learned parameters. The antenna selection component 199 is configured to transmit, for the UE and based on the output of the ML model, a second indication of at least two antenna elements of the plurality of antenna elements of the UE, where the at least two antenna elements are to be combined. The antenna selection component 199 is configured to transmit or receive first data or at least one signal via the combined at least two antenna elements. The antenna selection component 199 may be configured to receive an identifier for an application executed by the UE, where the second indication is further based on the identifier for the application. The antenna selection component 199 may be configured to receive an identifier for a type of application executed by the UE, where the second indication is based on the identifier for the type of the application. The antenna selection component 199 may be configured to switch at least one beam for the transmission or the reception of the first data or the at least one signal via the combined at least two antenna elements, where the at least one beam is switched based on the second indication. The antenna selection component 199 may be configured to receive an indication of a TCI state of the UE. The antenna selection component 199 may be configured to obtain, prior to receive the first indication of the obstruction, third data that is indicative of positions of body parts of a plurality of users of the plurality of UEs as the plurality of users utilize the plurality of UEs, antenna configurations of the plurality of UEs as the plurality of users utilize the plurality of UEs, and associated gains of the antenna configurations of the plurality of UEs as the plurality of users utilize the plurality of UEs. The antenna selection component 199 may be configured to train the ML model based on the third data, where the one or more learned parameters are based on the third data. The antenna selection component 199 may be within one or more processors of one or more of the CU 1610, DU 1630, and the RU 1640. The antenna selection component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for receiving a first indication of an obstruction of at least a portion of a plurality of antenna elements of a UE. In one configuration, the network entity 1602 includes means for providing, based on the first indication, data associated with the obstruction as input to a ML model that includes one or more learned parameters that are based on a set of usage patterns of a plurality of UEs. In one configuration, the network entity 1602 includes means for obtaining an output from the ML model based on the data and the one or more learned parameters. In one configuration, the network entity 1602 includes means for transmitting, for the UE and based on the output of the ML model, a second indication of at least two antenna elements of the plurality of antenna elements of the UE, where the at least two antenna elements are to be combined. In one configuration, the network entity 1602 includes means for transmitting or receiving first data or at least one signal via the combined at least two antenna elements. In one configuration, the network entity 1602 may include means for receiving an identifier for an application being executed by the UE, where the second indication is further based on the identifier for the application. In one configuration, the network entity 1602 may include means for receiving an identifier for a type of application being executed by the UE, where the second indication is based on the identifier for the type of the application. In one configuration, the network entity 1602 may include means for switching at least one beam for the transmission or the reception of the first data or the at least one signal via the combined at least two antenna elements, where the at least one beam is switched based on the second indication. In one configuration, the network entity 1602 may include means for receiving an indication of a TCI state of the UE. In one configuration, the network entity 1602 may include means for obtaining, prior to receiving the first indication of the obstruction, third data that is indicative of positions of body parts of a plurality of users of the plurality of UEs as the plurality of users utilize the plurality of UEs, antenna configurations of the plurality of UEs as the plurality of users utilize the plurality of UEs, and associated gains of the antenna configurations of the plurality of UEs as the plurality of users utilize the plurality of UEs. In one configuration, the network entity 1602 may include means for training the ML model based on the third data, where the one or more learned parameters are based on the third data. The means may be the antenna selection component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

As noted above, a UE may be configured with multiple antenna elements that may be selectively combined in order to increase gain associated with transmission/reception of data/signals. In an example, the multiple antenna elements may be located at different positions (e.g., different planes) in the UE. When the UE is held in the hands of a user, a portion of the antenna elements may become blocked. Blocked antenna elements may be associated with a reduction in antenna array gain, which may impact communications reliability at the UE. A UE may select different combinations of antenna elements to combine by performing signal quality measurements for each of the different combinations; however, performing signal quality measurements for the different combinations may be time consuming, may consume UE power, and/or may impact computational resources of the UE.

Various technologies pertaining to ML based antenna selection are described herein. In an example, a UE transmits a first indication of an obstruction of at least a portion of a plurality of antenna elements of the UE. The UE receives a second indication of at least two antenna elements of the plurality of antenna elements, where the second indication is based on the first indication and a set of usage patterns of a plurality of UEs. In an example, the second indication is based on an output of a ML model, where the ML model may utilize a crowdsourced approach for determining which antenna elements may be combined to achieve relatively high antenna array gains for communications at UEs. The UE combines the at least two antenna elements in the plurality of antenna elements based on the second indication. The UE transmits or receives first data or at least one signal via the combined at least two antenna elements. Vis-à-vis receiving the second indication of the at least two antenna elements, the UE may be able to combine antenna elements and transmit/receive data via the combined antenna elements in a manner associated with a relatively high antenna array gain and hence may improve communications reliability at the UE. Furthermore, the above-described technologies may reduce an amount of signal quality measurements performed by the UE and hence may be associated with reduced latency at the UE, reduced UE power consumption, and/or reduced usage of UE computational resources.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: transmitting a first indication of an obstruction of at least a portion of a plurality of antenna elements of the UE; receiving a second indication of at least two antenna elements of the plurality of antenna elements, where the second indication is based on the first indication and a set of usage patterns of a plurality of UEs; combining the at least two antenna elements in the plurality of antenna elements based on the second indication; and transmitting or receiving first data or at least one signal via the combined at least two antenna elements.

Aspect 2 is the method of aspect 1, where the plurality of antenna elements include a first subset of antenna elements and a second subset of antenna elements, where each of the first subset of the antenna elements is arranged in a first plane, where each of the second subset of the antenna elements is arranged in a second plane that is different from the first plane, where the at least two antenna elements include at least one first antenna element in the first subset of the antenna elements and at least one second antenna element in the second subset of the antenna elements.

Aspect 3 is the method of any of aspects 1-2, further including: obtaining the first indication of the obstruction based on sensor data generated by at least one sensor of the UE.

Aspect 4 is the method of aspect 3, where the at least one sensor of the UE includes: a radar, a camera, an accelerometer, a Doppler sensor, or a fingerprint sensor.

Aspect 5 is the method of any of aspects 1-4, where the second indication is based on an output of a ML model that includes one or more learned parameters, where the output of the ML model is based on the first indication and the one or more learned parameters, where the one or more learned parameters are based on the set of usage patterns of the plurality of UEs.

Aspect 6 is the method of aspect 5, where the one or more learned parameters are based on positions of body parts of a plurality of users holding the plurality of UEs in different positions.

Aspect 7 is the method of any of aspects 5-6, where the one or more learned parameters are based on positions of body parts of a plurality of users holding the plurality of UEs in different positions as the plurality of UEs execute a plurality of applications.

Aspect 8 is the method of aspect any of aspects 1-7, where the first indication is transmitted to an ML server associated with a ML model.

Aspect 9 is the method of aspect 8, where the second indication is received from the ML server associated with the ML model.

Aspect 10 is the method of any of aspects 1-9, further including: transmitting an identifier for an application being executed by the UE, where the second indication is further based on the identifier for the application.

Aspect 11 is the method of any of aspects 1-10, further including: transmitting an identifier for a type of application being executed by the UE, where the second indication is based on the identifier for the type of the application.

Aspect 12 is the method of any of aspects 1-11, further including: identifying a granularity of the obstruction, where the granularity of the obstruction corresponds to a partial obstruction or a complete obstruction, where the granularity of the obstruction is included in the first indication.

Aspect 13 is the method of any of aspects 1-12, further including: switching at least one beam for the transmission or the reception of the first data or the at least one signal via the combined at least two antenna elements, where the at least one beam is switched based on the second indication.

Aspect 14 is the method of any of aspects 1-13, where the at least two antenna elements are for uplink communication or downlink communication.

Aspect 15 is the method of aspect 14, where the at least two antenna elements include first at least two antenna elements if the at least two antenna elements are for the uplink communication, where the at least two antenna elements include second at least two antenna elements if the at least two antenna elements for the downlink communication, where the first at least two antenna elements are different from the second at least two antenna elements.

Aspect 16 is the method of any of aspects 1-15, further including: transmitting, for a network node, at least one of the first indication of the obstruction, the second indication of the at least two antenna elements, or a third indication of a transmission configuration indicator (TCI) state of the UE.

Aspect 17 is an apparatus for wireless communication at a UE including a memory and at least one processor coupled to the memory and based at least in part on information stored in the memory, the at least one processor is configured to perform a method in accordance with any of aspects 1-16.

Aspect 18 is an apparatus for wireless communications, including means for performing a method in accordance with any of aspects 1-16.

Aspect 19 is the apparatus of aspect 17 or 18 further including at least one of a transceiver or an antenna coupled to the at least one processor, where the at least one processor is configured to transmit the first indication of the obstruction of at least the portion of the plurality of antenna elements via at least one of the transceiver or the antenna, where the antenna is associated with the plurality of antenna elements.

Aspect 20 is a computer-readable medium (e.g., a non-transitory computer-readable medium) including instructions that, when executed by an apparatus, cause the apparatus to perform a method in accordance with any of aspects 1-16.

Aspect 21 is the method of wireless communication at a network node, including: receiving a first indication of an obstruction of at least a portion of a plurality of antenna elements of a UE; providing, based on the first indication, data associated with the obstruction as input to a ML model that includes one or more learned parameters that are based on a set of usage patterns of a plurality of UEs; obtaining an output from the ML model based on the data and the one or more learned parameters; transmitting, for the UE and based on the output of the ML model, a second indication of at least two antenna elements of the plurality of antenna elements of the UE, where the at least two antenna elements are to be combined; and transmitting or receiving first data or at least one signal via the combined at least two antenna elements.

Aspect 22 is the method of aspect 21, where the plurality of antenna elements include a first subset of antenna elements and a second subset of antenna elements, where each of the first subset of the antenna elements is arranged in a first plane, where each of the second subset of the antenna elements is arranged in a second plane that is different from the first plane, where the at least two antenna elements include at least one first antenna element in the first subset of the antenna elements and at least one second antenna element in the second subset of the antenna elements.

Aspect 23 is the method of any of aspects 21-22, where the one or more learned parameters are based on positions of body parts of a plurality of users holding the plurality of UEs in different positions.

Aspect 24 is the method of any of aspects 21-23, where the one or more learned parameters are based on positions of body parts of a plurality of users holding the plurality of UEs in different positions as the plurality of UEs execute a plurality of applications.

Aspect 25 is the method of any of aspects 21-24, where the network node is associated with a ML server.

Aspect 26 is the method of any of aspects 21-25, further including: receiving an identifier for an application being executed by the UE, where the second indication is further based on the identifier for the application.

Aspect 27 is the method of any of aspects 21-26, further including: receiving an identifier for a type of application being executed by the UE, where the second indication is based on the identifier for the type of the application.

Aspect 28 is the method of any of aspects 21-27, where the first indication includes an indication of a granularity of the obstruction, where the second indication is further based on the indication of the granularity of the obstruction.

Aspect 29 is the method of any of aspects 21-28, further including: switching at least one beam for the transmission or the reception of the first data or the at least one signal via the combined at least two antenna elements, where the at least one beam is switched based on the second indication.

Aspect 30 is the method of any of aspects 21-29, where the at least two antenna elements are for uplink communication or downlink communication.

Aspect 31 is the method of aspect 30, where the at least two antenna elements include first at least two antenna elements if the at least two antenna elements are for the uplink communication, where the at least two antenna elements include second at least two antenna elements if the at least two antenna elements for the downlink communication, where the first at least two antenna elements are different from the second at least two antenna elements.

Aspect 32 is the method of any of aspects 21-31, further including: receiving an indication of a TCI state of the UE.

Aspect 33 is the method of any of aspects 21-32, further including: obtaining, prior to receiving the first indication of the obstruction, third data that is indicative of positions of body parts of a plurality of users of the plurality of UEs as the plurality of users utilize the plurality of UEs, antenna configurations of the plurality of UEs as the plurality of users utilize the plurality of UEs, and associated gains of the antenna configurations of the plurality of UEs as the plurality of users utilize the plurality of UEs; and training the ML model based on the third data, where the one or more learned parameters are based on the third data.

Aspect 34 is the method of aspect 33, where the third data is further indicative of applications being executed by the plurality of UEs as the plurality of users utilize the plurality of UEs or types of the applications being executed by the plurality of UEs as the plurality of users utilize the plurality of UEs.

Aspect 35 is an apparatus for wireless communication at a network node including a memory and at least one processor coupled to the memory and based at least in part on information stored in the memory, the at least one processor is configured to perform a method in accordance with any of aspects 21-34.

Aspect 36 is an apparatus for wireless communications, including means for performing a method in accordance with any of aspects 21-34.

Aspect 37 is the apparatus of aspect 35 or 36 further including at least one of a transceiver or an antenna coupled to the at least one processor, where the at least one processor is configured to receive the first indication of the obstruction of at least the portion of the plurality of antenna elements via at least one of the transceiver or the antenna, where the antenna is associated with the plurality of antenna elements.

Aspect 38 is a computer-readable medium (e.g., a non-transitory computer-readable medium) including instructions that, when executed by an apparatus, cause the apparatus to perform a method in accordance with any of aspects 21-34.

What is claimed is:

1. An apparatus for wireless communication at a user equipment (UE), comprising:
 a memory; and
 at least one processor coupled to the memory and, based at least in part on information stored in the memory, the at least one processor is configured to:
  transmit a first indication of an obstruction of at least a portion of a plurality of antenna elements of the UE;
  receive a second indication of at least two antenna elements of the plurality of antenna elements, wherein the second indication is based on the first indication and a set of usage patterns of a plurality of UEs;
  combine the at least two antenna elements in the plurality of antenna elements based on the second indication; and
  transmit or receive first data or at least one signal via the combined at least two antenna elements.

2. The apparatus of claim 1, wherein the plurality of antenna elements include a first subset of antenna elements and a second subset of antenna elements, wherein each of the first subset of the antenna elements is arranged in a first plane, wherein each of the second subset of the antenna elements is arranged in a second plane that is different from the first plane, wherein the at least two antenna elements include at least one first antenna element in the first subset of the antenna elements and at least one second antenna element in the second subset of the antenna elements.

3. The apparatus of claim 1, wherein the at least one processor is further configured to:
 obtain the first indication of the obstruction based on sensor data generated by at least one sensor of the UE.

4. The apparatus of claim 3, wherein the at least one sensor of the UE includes:
 a radar,
 a camera,
 an accelerometer,
 a Doppler sensor, or
 a fingerprint sensor.

5. The apparatus of claim 1, wherein the second indication is based on an output of a machine learning (ML) model that includes one or more learned parameters, wherein the output of the ML model is based on the first indication and the one or more learned parameters, wherein the one or more learned parameters are based on the set of usage patterns of the plurality of UEs.

6. The apparatus of claim 5, wherein the one or more learned parameters are based on positions of body parts of a plurality of users as the plurality of UEs are held by the plurality of users in different positions.

7. The apparatus of claim 5, wherein the one or more learned parameters are based on positions of body parts of a plurality of users as the plurality of UEs are held by the plurality of users in different positions while the plurality of UEs execute a plurality of applications.

8. The apparatus of claim 1, wherein the first indication is transmitted to a machine learning (ML) server associated with a ML model.

9. The apparatus of claim 8, wherein the second indication is received from the ML server associated with the ML model.

10. The apparatus of claim 1, wherein the at least one processor is further configured to:
 transmit an identifier for an application executed by the UE, wherein the second indication is further based on the identifier for the application.

11. The apparatus of claim 1, wherein the at least one processor is further configured to:
 transmit an identifier for a type of application executed by the UE, wherein the second indication is based on the identifier for the type of the application.

12. The apparatus of claim 1, wherein the at least one processor is further configured to:
 identify a granularity of the obstruction, wherein the granularity of the obstruction corresponds to a partial obstruction or a complete obstruction, wherein the granularity of the obstruction is included in the first indication.

13. The apparatus of claim 1, wherein the at least one processor is further configured to:
 switch at least one beam for the transmission or the reception of the first data or the at least one signal via the combined at least two antenna elements, wherein the at least one beam is switched based on the second indication.

14. The apparatus of claim 1, wherein the at least two antenna elements are for uplink communication or downlink communication.

15. The apparatus of claim 14, wherein the at least two antenna elements include first at least two antenna elements if the at least two antenna elements are for the uplink communication, wherein the at least two antenna elements include second at least two antenna elements if the at least two antenna elements are for the downlink communication, wherein the first at least two antenna elements are different from the second at least two antenna elements.

16. The apparatus of claim 1, wherein the at least one processor is further configured to:
 transmit, for a network node, at least one of the first indication of the obstruction, the second indication of the at least two antenna elements, or a third indication of a transmission configuration indicator (TCI) state of the UE.

17. The apparatus of claim 1, further comprising: at least one of a transceiver or an antenna coupled to the at least one processor, wherein the at least one processor is configured to transmit the first indication of the obstruction of at least the portion of the plurality of antenna elements via at least one of the transceiver or the antenna, wherein the antenna is associated with the plurality of antenna elements.

18. A method of wireless communication at a user equipment (UE), comprising:
 transmitting a first indication of an obstruction of at least a portion of a plurality of antenna elements of the UE;
 receiving a second indication of at least two antenna elements of the plurality of antenna elements, wherein the second indication is based on the first indication and a set of usage patterns of a plurality of UEs;

combining the at least two antenna elements in the plurality of antenna elements based on the second indication; and transmitting or receiving first data or at least one signal via the combined at least two antenna elements.

19. An apparatus for wireless communication at a network node, comprising:
a memory; and
at least one processor coupled to the memory and, based at least in part on information stored in the memory, the at least one processor is configured to:
receive a first indication of an obstruction of at least a portion of a plurality of antenna elements of a user equipment (UE);
provide, based on the first indication, data associated with the obstruction as input to a machine learning (ML) model that includes one or more learned parameters that are based on a set of usage patterns of a plurality of UEs;
obtain an output from the ML model based on the data and the one or more learned parameters;
transmit, for the UE and based on the output of the ML model, a second indication of at least two antenna elements of the plurality of antenna elements of the UE, wherein the at least two antenna elements are to be combined; and
transmit or receive first data or at least one signal via the combined at least two antenna elements.

20. The apparatus of claim 19, wherein the one or more learned parameters are based on positions of body parts of a plurality of users as the plurality of UEs are held by the plurality of users in different positions.

21. The apparatus of claim 19, wherein the one or more learned parameters are based on positions of body parts of a plurality of users as the plurality of UEs are held by the plurality of users in different positions while the plurality of UEs execute a plurality of applications.

22. The apparatus of claim 19, wherein the network node is associated with a ML server.

23. The apparatus of claim 19, wherein the at least one processor is further configured to:
receive an identifier for an application executed by the UE, wherein the second indication is further based on the identifier for the application.

24. The apparatus of claim 19, wherein the at least one processor is further configured to:
receive an identifier for a type of application executed by the UE, wherein the second indication is based on the identifier for the type of the application.

25. The apparatus of claim 19, wherein the at least one processor is further configured to:
switch at least one beam for the transmission or the reception of the first data or the at least one signal via the combined at least two antenna elements, wherein the at least one beam is switched based on the second indication.

26. The apparatus of claim 19, wherein the at least one processor is further configured to:
receive an indication of a transmission configuration indicator (TCI) state of the UE.

27. The apparatus of claim 19, wherein the at least one processor is further configured to:
obtain, prior to receive the first indication of the obstruction, third data that is indicative of positions of body parts of a plurality of users of the plurality of UEs as the plurality of users utilize the plurality of UEs, antenna configurations of the plurality of UEs as the plurality of users utilize the plurality of UEs, and associated gains of the antenna configurations of the plurality of UEs as the plurality of users utilize the plurality of UEs; and
train the ML model based on the third data, wherein the one or more learned parameters are based on the third data.

28. The apparatus of claim 27, wherein the third data is further indicative of applications executed by the plurality of UEs as the plurality of users utilize the plurality of UEs or types of the applications executed by the plurality of UEs as the plurality of users utilize the plurality of UEs.

29. The apparatus of claim 19, further comprising: at least one of a transceiver or an antenna coupled to the at least one processor, wherein the at least one processor is configured to receive the first indication of the obstruction of at least the portion of the plurality of antenna elements via at least one of the transceiver or the antenna, wherein the antenna is associated with the plurality of antenna elements.

30. A method of wireless communication at a network node, comprising:
receiving a first indication of an obstruction of at least a portion of a plurality of antenna elements of a user equipment (UE);
providing, based on the first indication, data associated with the obstruction as input to a machine learning (ML) model that includes one or more learned parameters that are based on a set of usage patterns of a plurality of UEs;
obtaining an output from the ML model based on the data and the one or more learned parameters;
transmitting, for the UE and based on the output of the ML model, a second indication of at least two antenna elements of the plurality of antenna elements of the UE, wherein the at least two antenna elements are to be combined; and
transmitting or receiving first data or at least one signal via the combined at least two antenna elements.

* * * * *